(12) United States Patent
Wu

(10) Patent No.: US 9,977,669 B2
(45) Date of Patent: May 22, 2018

(54) ONLINE COMPUTING SYSTEM

(71) Applicant: Jianqing Wu, Hyattsville, MD (US)

(72) Inventor: Jianqing Wu, Hyattsville, MD (US)

(*) Notice: Subject to any disclaimer, the term of this patent is extended or adjusted under 35 U.S.C. 154(b) by 247 days.

(21) Appl. No.: 14/800,651

(22) Filed: Jul. 15, 2015

(65) Prior Publication Data

US 2015/0317153 A1 Nov. 5, 2015

Related U.S. Application Data

(63) Continuation of application No. 12/057,030, filed on Mar. 27, 2008, now Pat. No. 9,105,005.

(60) Provisional application No. 60/908,188, filed on Mar. 27, 2007.

(51) Int. Cl.
| | |
|---|---|
| G06F 15/16 | (2006.01) |
| G06F 9/44 | (2018.01) |
| H04L 29/06 | (2006.01) |
| G06F 17/10 | (2006.01) |
| G06F 17/30 | (2006.01) |
| G06F 11/36 | (2006.01) |
| G06Q 10/10 | (2012.01) |

(52) U.S. Cl.
CPC ............ *G06F 8/70* (2013.01); *G06F 11/3664* (2013.01); *G06F 17/10* (2013.01); *G06F 17/30864* (2013.01); *G06Q 10/10* (2013.01); *H04L 67/42* (2013.01)

(58) Field of Classification Search
CPC .......................... G06F 17/30864; G06Q 10/10

USPC .......................................................... 709/203
See application file for complete search history.

(56) References Cited

U.S. PATENT DOCUMENTS 7,210,148 B2 * 4/2007 Arnold ................ G06F 9/5044
709/203

OTHER PUBLICATIONS

NPL No. 1: Matlab, "Matlab Central" at http://www.mathworks.com/matlabcentral/fileexchange/ at waybackmachine, pp. 1-45, Feb. 8, 2006.*
NPL No. 2: OnlineConversion, "Welcome to OnlineConversion.com" at http://www.onlineconversion.com/ at waybackmachine, pp. 1-7, Feb. 4, 2006.*

* cited by examiner

*Primary Examiner* — Phuoc Nguyen
(74) *Attorney, Agent, or Firm* — Jianqing Wu

(57) ABSTRACT

An online computing system hosting a plurality of computing projects in the form of database records allows users to search computing projects by search keys, project ID or category names, conduct computation for found projects, and create new computing projects at client computers. Each computing job is performed by searching the database, selecting a computing project by clicking on one of the found links on the search result page, and providing data in a computing data input form for submission. A large number of computing projects can be created by a plurality of users on client computers.

20 Claims, 16 Drawing Sheets

Search For a Computing Project

Reference Search: (e.g."temperature")

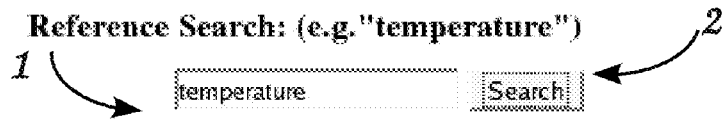

Project ID Search: (e.g. "1")

Advance Search

FIG. 1A

Search Result: Found Computing Projects

1. Convert temperature from C to F.
2. Convert temperature from F to C.
3. Convert temperature from C to F./Convert temperature from F to C.
4. Convert temperature from C to K./Convert temperature from K to C.
5. Convert temperature from F to K./Convert temperature from K to F.

Page 1 of 1 | Go to page: 1 | Records per page: 20 | First Back Next Last

FIG. 1B

Search For a Computing Project

Reference Search: (e.g."temperature")

FIG. 3A

Search Result: Found Computing Projects

1. Convert length from English to International Units/Convert length from International to English Units.

2. Convert length between two international Units. ← 3

FIG. 3B

Project ID: 5

Convert length between two international Units.

Instructions: Please enter your data in international unit.

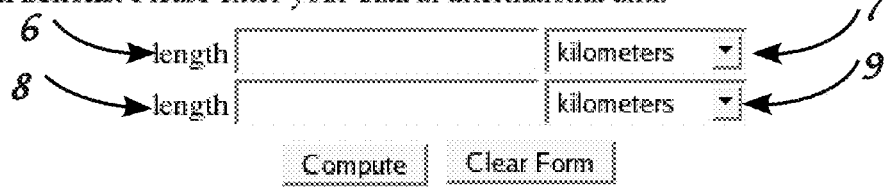

FIG. 3C

Project ID: 5

Convert length between two International Units.

Instructions: Please enter your data in international unit.

length [0.23] [meters ▼]
length [230] [millimeters ▼]

[Compute] [Clear Form]

Project ID: 4

1. Convert length from English to International Units

Instructions: Please enter length in English Units.

length [ ] [miles ▼]
length [ ] [kilometers ▼]

[Compute] [Clear Form]

13

2. Convert length from International to English Units.

Instructions: Please enter your data in International unit.

length [ ] [kilometers ▼]
length [ ] [miles ▼]

[Compute] [Clear Form]

Project ID: 4

1. Convert length from English to International Units

Instructions: Please enter length in English Units.

length [    ]  miles ▼ length [    ]  kilometers ▼

[Compute]  [Clear Form]

← 13

2. Convert length from International to English Units.

Instructions: Please enter your data in International unit.

length [2.54]  centimeters ▼ length [1]  inches ▼

[Compute]  [Clear Form]

Advanced Search For a Computing Project

Computing Quantity: [concentration] ← 8

Variable Name 1: [compound wt] ← 6

Variable Name 2: [    ]

Variable Name 3: [    ]

[Click for More Variable] ←

[Search]    [Reset]

FIG. 4A

Search Result: Found Computing Projects

1. Compute the concentration of a chemical solution  ←―③

FIG. 4B

Project ID: 1000114

Compute the concentration of a chemical solution  ←―⑤

Instructions: Please enter compound weight, formular weight, and final volume of your solution.

| | | |
|---|---|---|
| ⑥→ Compound Wt | 100.10 ←―11 | Grams ←―⑦ |
| Formula Wt | 10.0 | Grams/mol |
| ⑧→ Volume | 0.995 | Litter ←―⑨ |
| Concentration | 10.0603 ←―12 | Molality |

[ Compute ] [ Clear Form ]

1. Compute to determine if two variables are significantly different (Equal variances).

Instructions: Please type numbers and use same delimit

------------------------------Enter your Data Below------------------------------

Project title

Variable 1

```
1 2 3
1 2 3
```

NA

Variable 2

```
3 4 5 6 3 4
```

NA 15        16

------------------------------Following is Output------------------------------

| | | |
|---|---|---|
| V1 mean | 2 | NA |
| V1 data No | 6 | NA |
| V2 mean | 4.16667 | NA |
| V2 data No | 6 | NA |
| Degree of Freedom | 10 | NA |
| t value | -3.77775979 | NA |
| Probability | 0.00436403 | NA |

17        18

10 → Compute   Clear Form

FIG. 5B

Search For a Computing Project

Reference Search: (e.g."temperature")

[calculator] [Search]

FIG. 6A

Search Result: Found Computing Projects

1. Power Calculator or Programmable Calculator ←—3
2. Power Calculator 2 (Java Program)

Page 1 of 1 | Go to page: [1] | Records per page: [20 ▼] | First Back Next Last

FIG. 6B

Project ID: 3000021

Power Calculator or Programmable Calculator ←—4

Instructions: Please write a mathematical expression WITH NO SPACE ←—5

-------------------------------Enter your Data Below-------------------------------

Project title [Test the calculator.]

19 ↘ Expression [(12/18+34)*Log8]          20 ↙ [NA ▼]

21 ↘          -------------------------Following is Output-------------------------          22 ↙
Result [24.3242]                                                                      [NA ▼]

[Compute] [Clear Form]
10 ↗

FIG. 6C

| For students | For Professionals | General Applications |
|---|---|---|
| 1. Elementary Math | 1. Legal Professionals | 1. Unit Conversion |
| 2. Elementary Physics | 2. Medical Professionals | 2. Property Valuation |
| 3. Elementary Chemistry | 3. Medical labs and pharmacy | 3. Automobile Valuation |
| 4. High School Math | 4. Financial Professionals | 4. Stock Valuation |
| 5. High School Physics | 5. Management | 5. Tax Computation |
| 6. High School Chemistry | 6. Mechanical Engineers | 6. Statistics |
| 7. High School Biochemistry | 7. Chemical Engineers | 7. Linear Algebra |
| 8. College Math | 8. Civil Engineers | 8. Integration |
| 9. College Physics | | 9. Personal Finance |
| 10. College Chemistry | | 10. Power Calculator |
| 11. College Biochemistry | | |
| 12. Graduate Math | | |
| 13. Graduate Physics | | |
| 14. Graduate Chemistry | | |
| 15. Graduate Biochemistry | | |

FIG. 7

Create a Computing Project

Click Here for More Variables.

| | |
|---|---|
| Title: | A test of uploading project. ←4 |
| Search Key 1: | test ←1 |
| Search Key 2: | upload |
| Computing Method: 25→ | Y=c1*x+c2    [Select] |
| Notation Convention: 26→ | Generic math notation ▼ |
| Category No: 27→ | 13000     (See categroy number) |
| Name of Result: | Result ←8 |
| Unit of Result: | Result-unit ←9 |
| Name of Variable: | Variable ←6 |
| Unit of Variable: | Variable-unit ←7 |
| Constant 1: | 1.5 |
| Constant 2: | 5.0 ←28 |
| Contributor: | J. Testman ←29 |
| Use Instruction: | This is a project uploaded for testing purpose. ←5 |

If nessary, upload an detail instruction file:

Instruction File:    [          ] 浏览  ←5

[Submit]    [Reset]

FIG. 8A

Computing Project Has Been Added Successfully!

What Do You Want to Do?

1. Add Another Computing Project.

2. Test the Computing Project.   _30

3. Report Submission Error.

4. Log Out

FIG. 8B

Search For a Computing Project

Reference Search: (e.g."temperature")

*1* → [test]  [Search]

Project ID Search: (e.g. "1")

[      ]  [Search]

Advance Search

FIG. 8C

Search Result: Found Computing Projects

1. NO PROJECT IN THIS CATEGORY EXCEPT A TESTING PROGRAM

2. Testing Project 1/Testing Project 2.

3. A test of uploading project.

4. Compute for test purpose for two variables

5. Compute the sum of four variables for test purposes.

6. Compute the sum of four variables for test purposes.

Page 1 of 1 | Go to page: [1]  Records per page: [20]  First Back Next Last

FIG. 8D

Project ID: 71

A test of uploading project.

Instructions: This is a project uploaded for testing purpose.

Variable (x1) [15]   Variable-unit
Result (y) [27.5]   Result-unit

[Compute]  [Clear Form]

Project (ID: 71) was provided by J. Testman, but has not been verified.

[Terms of use]   Report computing error

ONLINE COMPUTING SYSTEM

CROSS-REFERENCE TO RELATED APPLICATION

This patent application is a continuation application of U.S. patent application Ser. No. 12/057,030, which claims the priority from the provisional application 60/908,188 accorded with a filing date of Mar. 27, 2007. Both of the prior applications are incorporated by reference in entirety.

COPYRIGHT NOTICE AND USE PERMISSION

A portion of the disclosure of this patent document contains material that is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever. The following notice applies to the software and data as described below and in the drawings hereto: Copyright 2007, Jianqing Wu, All Rights Reserved.

FIELD OF THE INVENTION

This invention relates to computation technology generally, and particularly to online computation technology.

BACKGROUND OF THE INVENTION

Computer programs for conducting mathematical computation are one of the earliest arts in the computer science. Every university and research institution has at least one computing center and some universities may have both a school-level computer center and many departmental computer centers. Before the advent of the Internet, computing programs for conducting mathematical computation are generally not user-friendly in part because how the computer technology evolved.

Despite the popularity of computing centers in the world, access to computing centers is often limited. Corporation computing centers are open only to their own employees for business use; school computing centers are open only to their students and faculty members; and governmental computer centers are not for the general public. Those who are unaffiliated with any school, research institute or governmental agency probably do not have access to any computing center.

Every person may from time to time have a need to do mathematical computation from simple tasks such as converting two different units, calculating interest charge on a loan, estimating mailing or shipping costs, to more complicated tasks such as optimizing resources for an organization and simulating a physical system. In conducting any computation, a person must know computing methods including the mathematical equations and all necessary constants. In addition, the person needs a computing instrument such as a computer or calculator. It is inconvenient in most of the cases.

The people who frequently need to conduct computation may buy computer programs. However, such programs are expensive and are not the best choice for infrequent users. Therefore, it would be desirable to construct an online computing center which can be freely accessed anywhere in the world. An online computing system would require two things: a search capacity for finding well-defined computing programs and a reliable web interface between the computing server and the remote users.

Limited online computing tools have been available decades ago. Examples of such tools include online calculators which may be found on some web sites. Such tools are not helpful to the users who do not know their relevant mathematical equations and necessary constants. Other computing tools such as computing web forms for computing monthly installation payments may be found on some web sites. However, those tools are not intended as a comprehensive and convenient tool for the general public. Besides, the computing tools are scattered on a large number of websites. When a person wants to compute some quantity, he would not know where to find it.

Throughout the development of the computing art, computing programs are implemented on desktop computers which may be delivered in local network systems. Historically, the programs have been developed to meet all computation needs for a company or university. A vast majority of the existing computing programs are developed in Fortran, Pascal, C and BASIC. Many such programs require unique interfaces which are specifically designed for them. Computing programs for statistical analysis and computation chemistry require unique and inconvenient user interfaces. Many advanced computing programs have been delivered through web protocol, but their interfaces are designed and implemented on a per-application-base. There is little difficulty to construct a web interface for a specific computing program. Generally, each interface must be programmed line by line. Whenever something is changed, the interface must be changed. No prior art has taught any method of using a database application to implement a large number of search-able computing programs and use a unified web interface to deliver them to end users through the Internet.

It is desirable to build an online computing center which can handle millions to billions of computing methods. Such a comprehensive computing system can be a useful tool for studying, teaching and learning, daily casual use, system design, engineering computation, personal financing management, professional services, and business applications. The potential needs are unlimited. However, it would be burdensome to implement all potentially useful computing programs by an Internet vendor. Therefore, it is desirable that the computing system should allow remote users to add "computing programs" which are accessible to everyone else.

From the above discussion, there is a need for finding a new method of packing a large number of computing programs together with only a single user interface; there is a need for providing a mechanism for users to search for and retrieve a computing program from a large number of available programs; there is a need for using an efficient schema for packing and indexing computing programs together; there is a need for finding a method of allowing users to add computing programs to be made available for subsequent use.

SUMMARY OF THE INVENTION

The present invention is a system and method for packing a large number of computing programs together (e.g., computing methods in one server) on a server so that the system has the following features:

Computing projects can be found by proper search keys; when a user types in one or more keys, the server searches through all computing projects in the form of project records and identifies all responsive projects and generates a list of links, each of which is associated with a computing project. The user is prompted to select one of the links associated with the retrieved computing projects by clicking on it. The server, in response, generates a web page containing one or more computing data input forms for the selected computing project, the form comprising at least one variable input box and at least one result-displaying box.

After the user types in all required data on the form and submits it to the server, the server finds the same record and retrieves all relevant computation data such as constants, and uses the computation data and user-submitted data to perform computation using the program that has been specified by the computing method data.

The computing process may be repeated. If the user finds that the result is not satisfactory, the user may change user-submitted data and resubmit the form for re-computation. In response, the server returns a new result together with user-submitted data in the original input boxes. After the user has selected a link associated with a computing project, the system keeps track of the same computing project by using record ID or other similar information such as group ID.

The system may contain plural database tables for holding computing projects with different number of variables. Plural table implementation may improve the hard disk utilization efficiency and search speed since different projects may be placed in different tables. In the preferred embodiment of the present invention, all one-variable computing projects are stored in a first table. In response to the user's search keys, when the server constructs a list of links, it can keep track of computing projects using their IDs and additional information such as variable numbers. In response to user's selection of a link associated with the computing project and generating a computing data input form, the server needs to search through only the first table because it knows the project has only one variable. Likewise, the server only needs to search through the first table to get computation data in conducting final computation. Some computing projects may require a large amount of project data, and they may be stored in a very large table. Therefore, it saves storage space because the table holding one-variable projects is only for small projects.

In anther aspect of the present invention, a method flag (i.e., a character or integer) is used to denote plural computing methods in a single final computing program so that a large number of computing methods can be programmed together. Each character or integer value means a unique method in the computing program. The method flag may be passed into the final computing program as a parameter of Java Program or a command line argument for a shell program such as C executable. The final computing program may be any executable program such as Java program, shell program, executable C/C++ program, or CGI C/C++ program as long as the project data can be passed into the computing program and the result can be returned to a JSP program for rendering. If JSP program is not used, the result may be in a web form format for rendering. This schema allows hundreds to thousands of computing methods to be included in a small final computing program, which can support an extremely large number of computing projects.

In yet another aspect of the present invention, the system also provides a schema which allows any user to add computing projects, preferably as unverified projects. A large number of computing methods are coded into a small set of programs. Common computing methods for a large number of one-variable functions such as $c_1*x+c_2$, $c_1/x$, $log(x)$, $ln(x)$, $sin(x)$, $cos(x)$, $x+c_1$, $c_1/(x-c_2)$, $x*x+x+c$, $sqrt(x)$ are programmed in one final computing program with correspondent method-flag values. Similarly, a large number of computing methods for 2 to 3 variables functions may be programmed into another program with respective method-flag values. Computing methods for more variables and constants may be programmed in another final computing program with respective method-flag values. After such a computing system is built, a map ("method table" or "method flag table") showing the relationship between mathematical functions and program names/method-flag values is then constructed. This map can help the user designate a right program name together with a correct method-flag value. As a result, any user, who is not permitted to develop programming code for final computing programs, can submit a computing project as long as the required computing method exists on the server and the map. All equations from a typical college mathematical handbook may support everyday computing needs. Adding all computing methods for a mathematical handbook is a manageable task in this arrangement.

In anther aspect of the present invention, one of the computing data input forms is designed to accept a block of data points delimited by space, semicolon or any other agreed mark. This type of computing data input form is used for computing projects in statistics and linear algebra. A user instruction for each of the computing projects tells the user how to provide data. When the user provides data and sends the filled computing data input form to the server, the server's JSP program passes the data as a string to the final computing program. The final computing program then parses the data string, gets the values for all the data variables, and uses the values to conduct computation using the function associated with the method-flag value. It then writes the result, which could be a matrix or vector, into a data string and sends it back to the JSP program for rendering. This version of the forms allows the client computer and the server to exchange a large amount of computing data normally expected in application.

Optionally, each of the data points, including the data points in the matrix and vector, may include a mathematical expression such as (12+4*/(log 5+sin(30)) as long as the expression itself does not contain a data point delimit. The server treats the entire expression as one data unit and passes it to a mathematical expression decoder which returns a value for subsequent use. This allows the user to provide a mathematical expression as a data point whenever the user does not know the real value. For example, when a user computes monthly installation payments for a loan, the user knows that an equation for determining interest rate is Rate=0.7*x+2.9%, where x is a current LIBOR rate. The user can provide the equation with a LIBOR value in the expression as one single datum point. The server can compute the result. This feature helps the user save the step of computing the interest rate first.

Many additional features may be provided for managing open-source computing projects. Those features include database management tools which can be used to view computing projects and edit their data. Another utility tool may be used to upload computing project data and such tool is used by administration to upload the data for a large number of projects.

BRIEF DESCRIPTION OF DRAWINGS

FIG. 1A shows the first page containing a search box.
FIG. 1B shows a list of links responsive to a search.

FIG. 3A shows a search box containing a search-key "length."

FIG. 3B shows two links responsive to the search-key "length."

FIG. 3C shows one computing data input form for length (for unit conversion).

FIG. 3D shows a conversion operation using two different units which are selected by the user.

FIG. 3E shows two computing data input forms for one of the links for in responsive to search key "length."

FIG. 3F shows a computing operation using the second input box for length conversion.

FIG. 4A shows a web page for conducting an advanced search with a varying variable number.

FIG. 4B shows a link responsive to an advanced search using two search keys.

FIG. 4C shows a computing data input form for three variables and a computing example with three variables.

FIG. 5A shows a computing data input form having two blocks of input data and three blocks of output data, and a computing example of solving to a linear equation.

FIG. 5B shows a computing data input for two blocks of input data and seven blocks of output data, and a computing example for conducting a statistical analysis to determine if two random variables are equal.

FIGS. 6A, 6B and 6C show a search page for finding a calculator, t a link for invoking the calculator, and a data input form for conducting a calculation using one single input box.

FIG. 7 shows a project menu view which is generated by using top menu and sub-menus.

FIG. 8A shows a form for creating a computing project by users on a browser.

FIG. 8B shows a list of links in response to the submission of a computing project.

FIG. 8C shows a search page for searching a newly uploaded project by using "test."

FIG. 8D shows a list of links in response to the search using "test."

FIG. 8E shows the data input form and computing result for a newly uploaded project.

DETAILED DESCRIPTION OF THE INVENTION

The purpose of this invention is to provide an online computing system which is versatile, convenient to use, easy to maintain, and comprehensive in application scope. It is accessible from any computer in the Internet or a private LAN.

In order to reduce programming efforts, the online computer system is constructed on the principle that one mathematical equation may be used in many practical applications. Computing algorithms for solving a mathematical equation such as $Y=C1*X+C2$ are all similar, regardless of the programming language in which the algorithms are developed and the platform on which the algorithms run. Thus, a computing algorithm for a given mathematical equation may be used for many practical applications. Solely for the convenience of disclosure, a "computing method" means a computing method implemented in a final computing program while a "computing project" means an application project that is designed to perform computation for some practical purposes by using a computing method. It is immediately obvious that one single computing method may be used in a large number of computing projects. For example, a linear equation computing method implemented in a program can be used by thousands of unit-conversion computing projects and millions of other daily applications.

In order to build an online computing system capable of handling a large number of computing projects, a database application is used. The database application is not used to merely index computing projects, but is used to substantially reduce programming effort. From the discussion of the relationship between mathematical methods and computing projects, it is desirable to take advantage of the application multiplicity of computing algorithms. Therefore, the database table is designed to store both computing-method-specific data ("computing method data") and computing-project-specific data ("computing project data"). In addition, the database table may also contain dedicated fields for holding search keys ("query data") and data fields holding the information about the development history and the contributor of the project ("source data").

A. The Concept of the Online Computing System

Figures 1C, 1D:
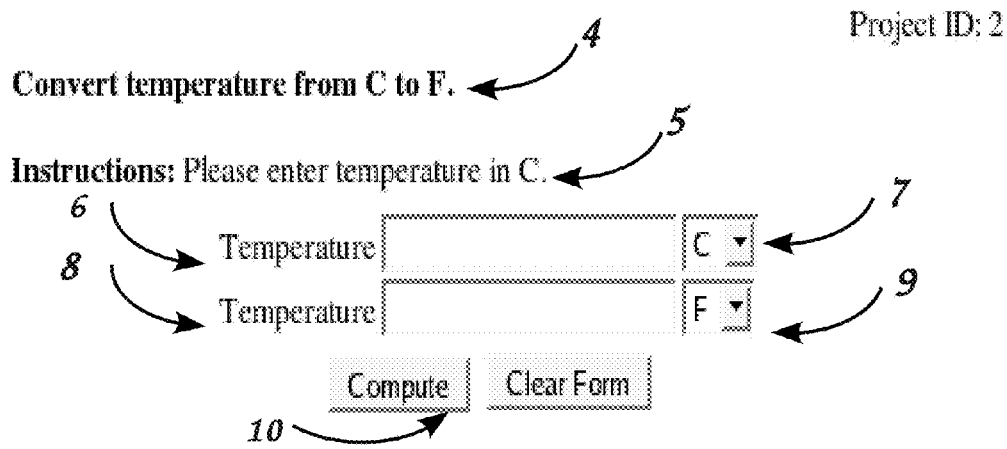
FIG. 1C shows a computing data input form.
FIG. 1D shows the data in a variable box and the result computed by the server.

FIGS. 1A-1D shows the basic idea of the online computing system of the present invention. The purpose of this simple computing system is to provide an on-line searchable unit-conversion handbook. When a user gains an access to the system, it presents a search page (FIG. 1A). The user types in one or more search keys 1 such as "temperature" or "pressure" on the top box and presses the search button 2, the system then returns a few hits which are in the form of links 3 (FIG. 1B). The user then clicks on the following link:

1. Convert Temperature from C to F.

If the user types in different search keys such as pressure, length, and concentration, the user gets different links.

In response to the user's click, the server produces a computing data input form (also referred to as "data input form") (FIG. 1C). The form contains a title or use description ("project title") 4, user instruction 5, a variable name temperature 6, variable unit 7, result name 8, result unit 9, and a submission button 10. The form allows the user to type in necessary data in the top input box 11 for temperature. The user then sends the filled form to the server by pressing the "Computing" button 10. The server first extracts the data from the user-filled form, uses the hidden record ID to find the same record, retrieves the necessary computation data for the record from a database table, and performs the required computation by using the computation data (i.e., the constants) and user-provided value, "37". After the server conducts computation, it returns "98.6" as the result 12 on the result page (FIG. 1D).

This is the simplest computing project for computing a quantity using one variable and two constants. The online computing system of the present invention may be used to compute complex computing projects in many fields such as linear algebra, statistics, and calculus. Some complex computing data input forms are shown in FIGS. 3E, 4C, 5A and 6B. For most computing projects, a user can have a project computed by going through four web pages: a search page, a links page, a computing data input form, and a result page. The computing data input form and result form may be the same, and they are more complex for complex computing projects. The user interfaces for most computing projects in the present invention are similar in terms of operating steps.

B. Hardware Required for the Online Computing System

Figure 2:
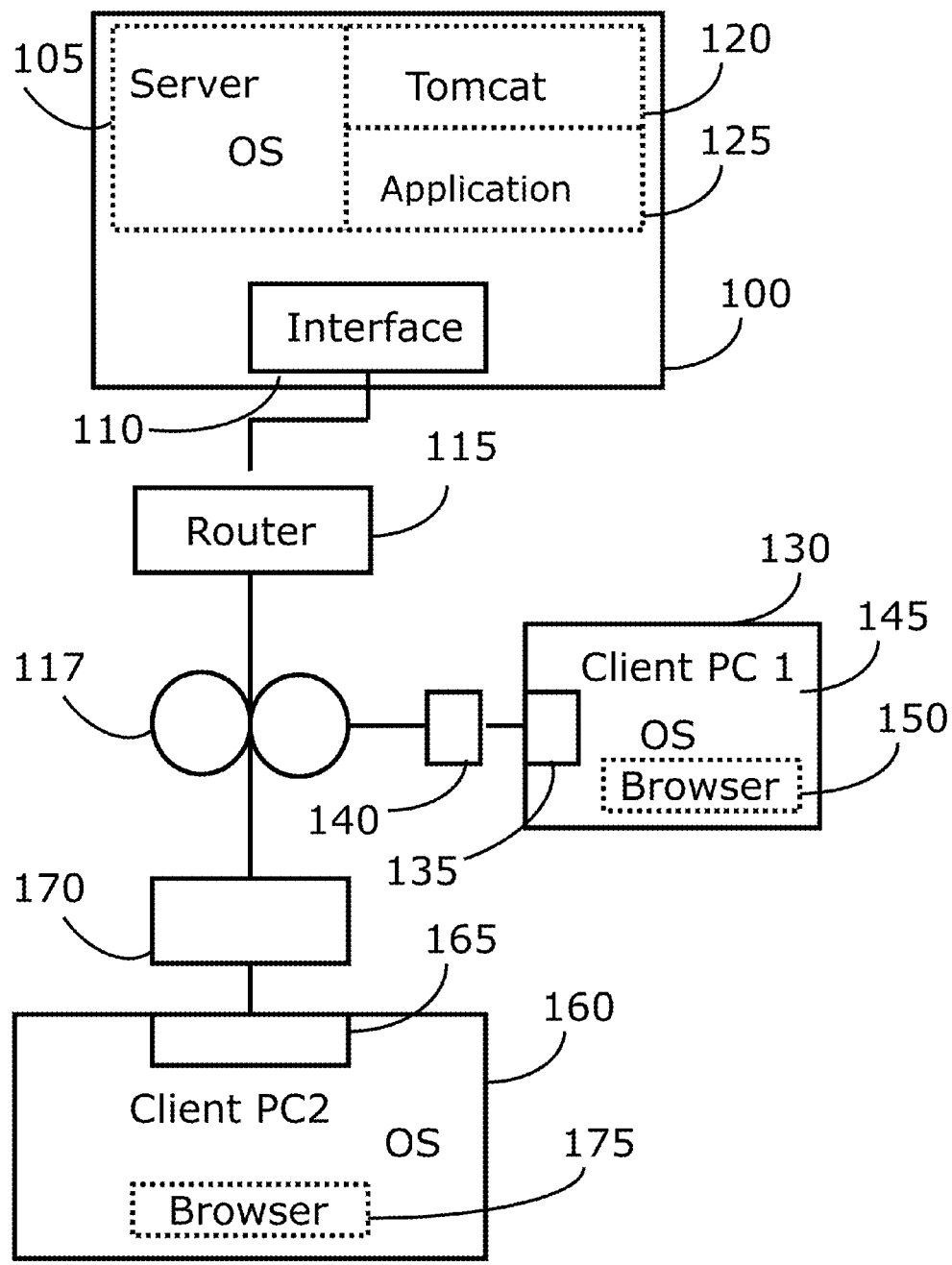
FIG. 2 shows the hardware components of the online computing system.

The hardware required for this computing system is a fully functional server in a network and at least one client computer which can have an access to the server using HTTP protocol (FIG. 2). The online computing system, also referred to as OCC, comprises a server 100 and client computers 130 and 160, all of them are in a network so that they are able to exchange data using common data transferring protocol such as TCP.

The server 100 runs an operating system 105 and is fully functional, has a network interface 110, and is connected to the Internet 117 through a router 115. In one version of the preferred embodiments, the server was made of an Intel D945PNS motherboard with a Pentium D 940 processor being operated by Fedora Core 5. Although the system came with a package of Java tool, a Java Development Kit (JDK version 1.5.06) was installed for compiling Java class files. In the ext folder inside the lib folder of the Java Runtime Environment (/usr/share/jdk/jre/lib/ext), some required jar files were placed. Those required jar files were also placed in the folder common/lib in the Tomcat installation folder. To handle file uploading, a package known as jspsmartupload (or equivalents), which includes several class files, was used. The server was installed with Apache Tomcat 5.5.15 and MYSQL 5.0.27. To allow Java class components to access the MYSQL database, mysql-connector-java.jar was placed inside common/lib folder.

MYSQL database application (not shown in FIGS) is used for user account management and storage of computing application project data.

The client computer 130 was also operated by its own operating system, had a network interface 135, and was connected to the Internet 117 through a router 140. The client computer 130 had a browser or any similar HTML rendering application so it was able to access the server 100 using the WWW protocol and access the web pages from the server 100 according to the current standard HTTP protocols (1.0, 1.1, and 1.2).

Optionally, a second computer 160, which was also operated by its own operating system, had a network interface 165, and was connected to the Internet 117 through a router 170. Any of the client computers may be a virtual computer residing on the server itself. Therefore, a client computer may also mean a virtual computer on the server.

The application source files developed for this invention include JSP pages and Java class files. The JSP pages were placed inside the application folder or its sub-folders. Compiled Java class components were placed in the class folder under the WEB-INF folder. Inside the WEB-INF folder, there was a lib folder. The lib folder contained some jar files. The class folder further contained plural sub folders with different names, each containing compiled Java class files. Java components and all jar files were compatible with the JSP container Tomcat application. All Java class files were compiled by using Javac from Java Development Kit (1.5.06), whose jre/lib/ext contains necessary API jar files such as mail.jar and activation.jar. The compiled files were placed in proper class folders. In such a system, the JSP pages would provide all direct interfaces with the client computer. The components that were used repeatedly were compiled as class files. Under this working system, a web page running on browser was able to access the database through the JSP pages and a Java class database access object.

After installation, all files necessary for running the web application are saved in a hard disk of the server 100. Computer program files, lib files, and database data were routinely stored in portable computer storage media for backup.

Computer readable storage media commonly used in computer application development include floppy diskette, hard disks, random access memory, read-only memory, erasable programmable read-only memory, portable compact discs, optical storage devices, and magnetic storage devices.

The privilege to access to the database table must be granted to users. The details for granting the privilege depend upon the database application type and the server application type such as Apache server and specific applications (CGI versus Tomcat) for making the web page.

C. The Method of Building Online Computing System

The system is built according to the following steps:

Step 1: Constructing a Database and a Table, Linear_Matrix, with Proper Grants

To build a simple online computing system, a database must be designed in a unique way. The basic idea is that each of the computing projects is defined by one unique database record in a suitable table, and each of the computing project records comprises (1) computing method data, (2) form-data or form-making data, (3) computation data, (4) query data, (5) data-source data, and (6) project source data. The usages of those data are as follows:

Computing method data include final computing program name plus an optional method-flag for specifying particular computing method for the project.

Form-making data are all data that are necessary for constructing a computing data input form. For the page shown in FIG. 1C, the form-making data include variable name 1 ("temperature"), variable unit 7 ("C"), result name 8 ("temperature"), and result unit 9 ("F"). The use description 4 ("Convert temperature from C to F") is also extremely desirable. Optional form-making data include the contributor's name of the project, user instructions, and mathematical equation image Computation data are all data required for conducting computation. The data include the values stored in all constants fields. In addition, the variable units and result units are also necessary in some cases for performing computation because for a given computation, the values of one or more constants depend upon the variable units and result units. This can be easily seen from the example of length conversion: the conversion constant for converting length from meter to centimeter is 100 but it would be 1000 if the result unit is millimeter. Computation data include user-submitted data such as variable values which are not in the record.

Query data are the keywords stored in each of the project records. Those data are stored in one or more fields. The server searches through the fields to determine if the record should be printed as a responsive link on the search result page. However, searches may be performed against the record_id, group_id, variable names, variable units, result names, result units, and use description.

Data-source data include the path and URL which are used to get updated application data. Real-time data are useful in computing projects that require the most recent data such as current interest rate and current stock price.

Project source data include the contributor's name and verification status of the project.

Solely for convenience, the fields of a same type on web page view are numbered by an identical numeral. It should be understood they have different meanings in mathematics. [end]

In one preferred embodiment of the present invention, the server uses record id to find a target project record for subsequent use. However, when plural computing operations are grouped as one project entry, the server may use group_id, variable unit, and result unit as search keys to find target records.

Figure 10:
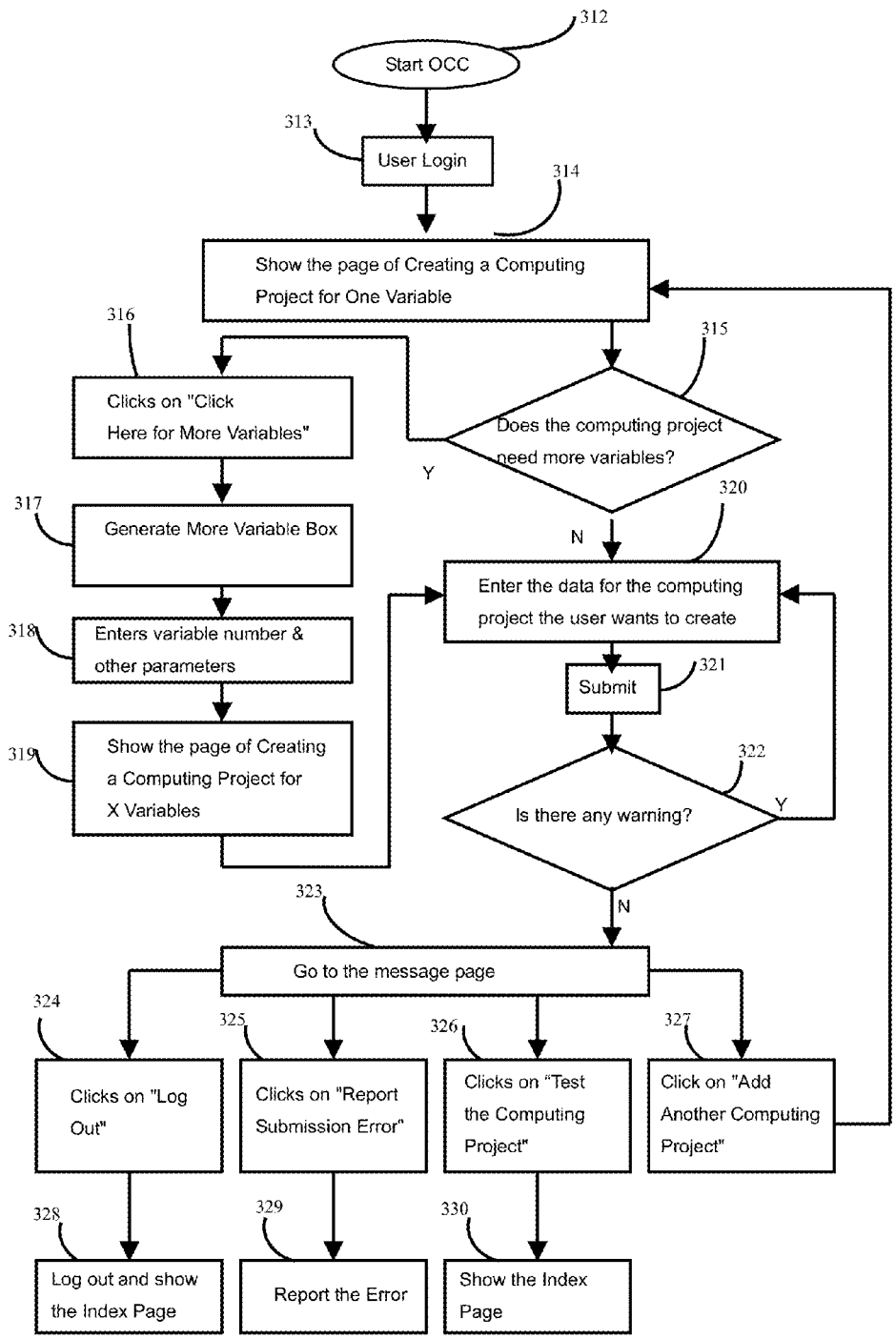
FIG. 10 is a flow chart showing detailed steps of uploading a computing project.

Application-specific data such as variable units and result units may be selected by the user in computation, as shown in the drop-down menu in FIG. 10. Each of the project records contains one or more fields holding variable names and result names (e.g., temperature or length) but does not have fields for storing variable values and result values. This is because variable values are to be provided by the user while result values are computed by the server. Variable values and result values are never saved on any of the project records. The project data that can be entered by the user or modified by user-selection are referred to as user-submitted data. They include variable units, result units, variable values, and optional use description (to be used for identification purpose).

The simplest computing method in mathematics is a one-variable linear equation. In one embodiment of the present invention, a linear equation is used as a computing method, $Y=a*X+b$. Thus, a database "OCC" or "Handbook" and a table "linear_matrix" are created for holding one variable and two constants. The "linear_matrix" table contains the following fields:

TABLE 1

The basic linear_matrix table structure

| Fields | Types | Fields | Types |
|---|---|---|---|
| record_id | int unsigned | variable_unit1 | varchar[10] |
| search_key1 | varchar(50) | result_name | varchar[10] |
| search_key2 | varchar(50) | result_unit | varchar[10] |
| use_description | varchar(200) | constant1 | float |
| computing_program | varchar(100) | constant2 | float |
| method_flag | varchar(20) | source_flag | varchar[10] |
| variable_name1 | varchar[10] | | |

This table is referred to as a computing method matrix table because each of the record defines a computing method in terms of a program name and method flag. Each of the records in the table is intended to define a complete computing project. This table is mainly intended for linear method $Y=a*x+b$ although it may contain computing projects of non-linear problems. Different matrix tables are created for other more complicated computing projects.

An extremely large number of daily computing problems can be solved by using a one-variable linear equation. The second record in the "linear_matrix" table contains the following data:

TABLE 2

Project data in record_id 2 for temperature conversion

| Fields | Values |
|---|---|
| record_id | 2 |
| search_key1 | temperature |
| search_key2 | C., F. |
| use_description | Convert temperature from C. to F. |
| computing_program | LinearEquation |
| variable_name | temperature |

TABLE 2-continued

Project data in record_id 2 for temperature conversion

| Fields | Values |
|---|---|
| variable_unit | C. |
| result_name | temperature |
| result_unit | F. |
| constant1 | 1.8 |
| constant2 | 32 |

In this record, search_key1 and variable_name happen to have the same value, but they could have different value. For example, search key1 may contain "gas law" for a computing project where the variables may contain "temperature" and "pressure." Suppose that the 98th record in the "linear_matrix" table contains the following project data:

TABLE 3

Project data in the record_id 98 for pressure conversion

| Fields | Values |
|---|---|
| record_id | 98 |
| search_key1 | pressure |
| search_key2 | PSI, atmospheres |
| use_description | Convert pressure from PSI to atmospheres. |
| computing_program | LinearEquation |
| variable_name | pressure |
| variable_unit | PSI |
| result_name | pressure |
| result_unit | atmospheres |
| constant1 | 0.06804 |
| constant2 | 0 |

Step 2: Constructing Links for Found Computing Projects

The server first gets the search key value from the user, uses the value to search through the search_key1 field, finds all records containing the value of the search key and constructs links for the found computing projects. FIG. A shows a search page for searching computing projects. The page contains the following code:

```
<html> [JavaScript code for ensuring the form is filled is omitted]
<body>
<h1>Welcome to Online Computing Center!</h1>
<table><tr>[Navigation code omitted]</tr></table>
<table><form name="frmKey" method="post" action="userKey"
onsubmit="returncheckForm( )">
<tr><td><b><h3>Please enter search key:</h3><b></td>
<td><input type="text" name="txtKey"></td></tr>
<tr><td><input type="submit" name="search" value="Search">
</td></tr></form>
</table></body></html>
```

If the user types in "temperature" in the search key box 1 on the search page in FIG. 1A, and submits the page to the server, the server processes the form by the following code:

```
public class userKey extends HttpServlet {
private String txtKey; private HttpSession session;
public void init( ) throws ServletException { }
public void doGet(HttpServletRequest request, HttpServletResponse
response) throws
ServletException, IOException {
   doPost(request,response);
}
public void doPost(HttpServletRequest request, HttpServletResponse
response)
```

-continued

```
throws ServletException, IOException {
  try{
    txtKey = request.getParameter("txtKey");
    session = request.getSession(true);
    session.setAttribute("txtKey", txtKey);
    response.sendRedirect("userSelect.jsp");
    return;
  }catch(Exception e) {
    response.sendRedirect("error.jsp?err="+e);
  }
 }
}
```

The program first gets the search key, sets the session object with the search key, and redirect to user.Select.jsp, which contains the following code:

```
<%@ page contentType="text/html; charset=gb2312"
language="java"%>
<%@ page import="java.util.*,handbook.*"%>
<jsp:useBean id="info" class="handbook.userSelect" />
<html><body><h1>Online Computing Center</h1>
<table><tr>[code for navigation button omitted]</tr></table>
<h3><b>Please select your choice.<b><h3>
<ol>
<%Vector searchInfo; Vector flag;
String txtKey=(String)session.getAttribute("txtKey");
try{
  info.setInfo(txtKey);
  info.retrieve( );
  searchInfo=info.getUse_description( );
  flag=info.getFlag( );
}catch(Exception e) {
  RequestDispatcher dispatcher=
  request.getRequestDispatcher("error.jsp?
  err="+e.getMessage( ));
  dispatcher.forward(request,response);
  return;
}
for(int i=0;i<searchInfo.size( );i++) {%>
<li><a href="form_maker.jsp?flag=<%=flag.elementAt(i)%>">
<%=searchInfo.elementAt(i)%></a></li>
<%}%>
</ol>
</body></html>
```

The above program is responsible for creating simple links (like those first two links in FIG. 1B). Before it can create the links, it uses the Java Bean, userSelect, to find computing projects from the database table. The Java Bean program contains the following code:

```
[From Appendix J - userSelect.java]
public class userSelect {
[declaration of dbhandler; txtKey; use_description; flag;
and vector use_descriptions, and vector flags;]
public void setInfo(String s) { txtKey=s; }
public void retrieve( ) throws Exception{
  use_descriptions=new Vector( );
  flags=new Vector( );
  dbhandler = new webdb("webdb.properties");
  dbhandler.connect( );
  String strDescription = "select distinct
  (use_description1),unit_flag from
  linear_matrix where search_key1='"+txtKey+"'";
  dbhandler. retrieve(strDescription);
  ResultSet rst=dbhandler.getResultSet( );
  while (rst.next( )){
    flag=rst.getInt("unit_flag");
    use_description=rst.getString("use_description1");
    use_descriptions.addElement(use_description);
    flags.addElement(flag);
  }
```

```
  rst.close( );
  dbhandler.closeConnection( );
 }
 public Vector getUse_description( ) { return use_descriptions; }
 public Vector getFlag( ) { return flags; }
}
```

The Java program conducts a search using user-provided key and finds computing projects by use_description and unit_flag. It then adds use_description and unit_flag into two vectors. This program was developed for an early version of database table, linear matrix, where unit_flag served as record_id. Those two vectors are used by userSelect.jsp in creating the links to be placed on the search result page.

Assuming that another record in the database also contains temperature, the server finds two records in total. The server then constructs the link 3 for this record 2 substantially using the value from use_description as the displayed title.

1. Convert temperature from C to F.
2. Convert temperature from F to C.

Assuming that the JSP program that the first link points to is form_maker.jsp on server www.occhost.com, the relevant HTML code for the link on the search result page for the record 2 is as follows:

<a href="http://www.occhost.com/form_maker.jsp?record_id=2">Convert temperature from C to F.</a>

And, the link for the record 98 could be:

<a href="http://www.occhost.com/form_maker.jsp?record_id=98">Convert pressure from PSI to atmospheres.</a>

Step 3: Constructing a Computing Data Input Form

When the user clicks on "Convert temperature from C to F," the browser on the client computer contacts the server program, form_maker.jsp, with record_id=2, the server then gets the string value 2, converts it to an integer, uses it to find the record 2, and reads necessary form-making data from the record 2. It then constructs a computing data input form (FIG. 1C), allowing the user to input the value 11 of the temperature.

A computing data input form may contain the following relevant code:

```
10. <form="form_2" action="computing.jsp" Method="Post">
20. <input type="hidden" name="record_id" value="2">
30. Please enter your temperature in C:
40. <input type="text" name="variable_value" size="50">
42. Result temperature in F:
45. <input readonly type="text" name="result_value" size="50" value="">
50. <input name="SUBMIT" type="SUBMIT" value="Submit Request">
60. <input name="RESET" type="RESET" value="Reset Form">
70. </form>
```

This is a generic web form, whose fields are not well aligned on the web page. This form is submitted by using POST. It has a hidden field holding the record-id in line 20. It prints the statement "Please enter temperature" in line 30, and prints an input box at line 40. It also places SUBMIT and RESET buttons respectively in lines 50 and 60. When the user types in a value "37" in the input box for variable value 11 and clicks on the "Compute" button 10, the browser actually sends "name=temperature&value=37" to the server for processing. Line 45 prints an input box for result_value 12. Result_value has no value initially and the user is not allowed to enter anything because it is a read-only input box.

A form can be constructed for any record associated with a computing project as long as it uses only one variable and no more than two constants for this table. A computing data input form constructed for the record 98 would be substantially similar to the above form except that the former is for computing pressure.

In a preferred embodiment, the computing data input form is "reusable". The following reusable form is converting length between two international units.

```
<html><head><title>Online computing center</title></head>
<body>
<table align="center"><tr><td><h1><b>Welcome to
Online Computing Center</b></h2></td></tr></table>
<form name="form1" action="LinearEquation" method="Post">
<input type="hidden" name="unit_flag" value="200">
<input type="hidden" name="table_flag" value="0">
<input type="hidden" name="variable_no" value="1">
<input type="hidden" name="use_description1" value=
"Convert length between two international Units.">
<table><tr><td>Convert length between two international Units.
</td></tr></table><br>
<table><tr><td>length</td>
<td><input type="text" name="variable_value1"
size="20" value='10.0'></td>
<td><select name="variable_unit1" size="1" >
```

-continued

```
<option selected>kilometers
<option>meters
<option>centimeters
</select></td></tr>
[<tr>was omitted here] <td>length</td>
<td><input type="text" name="result_value"
size="20" value='10000.0'></td>
<td><select name="result_unit" size="1" >
<option selected>meter
<option>centimeters
<option>millimeters
</select></td></tr></table>
<table><tr><td><input type="submit" value="Computing"></td>
<td><input type="reset" value="Reset"></td></table>
</form></body></html>
```

To be reusable, the computing data input form points to the same computing program, such as LinearEquation. The form contains both variable value, 10, and result value, 1000, it shows the previously selected variable unit ("kilometers") and previously selected result unit ("meter"), but also allows the user to change the variable value, the variable unit, and result unit. To generate the above computing data input, form_maker.jsp needs variable name1 (i.e., start); result_name (i.e., end), use_description, start_unit, and end_unit. In the following Java program, the variable name is referred to as "start", result_name as "end", variable unit as "start_unit", and result unit as "end_unit".

```
public class form_maker {
[Declaration of dbhandler; unit_flag2; search_key1; use_description; variable_name1;
start; end; result_name; Vector start unit; Vector end_unit;]
public void setInfo(String s) {unit_flag2=Integer.parseInt(s);}
public void retrieve( ) throws Exception{
    start_unit=new Vector( );
    end_unit=new Vector( );
    dbhandler = new webdb("webdb.properties");
    dbhandler.connect( );
    String strDescription="select search_key1, variable_name1, variable_unit1,
    result_name, result_unit, use_description1 from linear_matrix where
    unit_flag='"+ unit_flag2 +"'";
    dbhandler.retrieve(strDescription);
    ResultSet rst=dbhandler.getResultSet( );
    while (rst.next( )){
        search_key1=rst.getString("search_key1");
        variable_name1=rst.getString("variable_name1");
        start=rst.getString("variable_unit1");
        result_name=rst.getString("result_name");
        end=rst.getString("result_unit");
        use_description=rst.getString("use_description1");
        start_unit.addElement(start);
        end_unit.addElement(end);
    }
    rst.close( );
    dbhandler.closeConnection( );
}
public String getSearch_key1( ) {return search_key1;}
public String getVariable_name1( ) {return variable_name1;}
public String getResult_name( ) {return result_name;}
public String getUse_description( ) {return use_description;}
public Vector getStart_unit( ) {return start_unit;}
public Vector getEnd_unit( ) {return end_unit;}
}
```

Step 4: Conducting Final Computation and Returning Final Result

After the user submits the filled form to a JSP computing program (The JSP page which may be named as computing.jsp or result.jsp or any suitable name) on the server, this program works as an interface with the client browser while the computing task may be delegated to another dedicated computing program (which may have the database-accessing function). This JSP program first gets all values by using "request.getParameter(name)," and constructs an identical computing data input form with the result box to be filled by the result value from the final computing program. Before the final computing program can conduct the final computation, it requires computation data such as the values of constant1 and constant2. [end] The entire process may be shown by the following generic code.

```
100.   int record_id = Integer.parseInt(request.getParameter("record_id"));
110.   dbhandler.retrieve("select * from linear_matrix where record_id='"+record_id+"' ");
120.   ResultSet rs = dbhandler.getResultSet( );
130.   while(rs.next( )) {
140.   variable_name = rs.getString("variable_name");
150.   constant1 = rs.getFloat("constant1");
160.   constant2 = rs.getFloat("constant2");
170.   }
180.   float variable_value=Float.valueOf(request.getParameter(variable_name));
```

The server gets the value ("2") for record-id and converts it into an integer in line 100. It then retrieves the record in line 110. It then assigns the found record to a variable rs in line 120 and retrieves the values for variable name, constant1 and constant2 from rs in lines 140-170. The value, 37, for the variable value, is submitted by the user, and is stored in variable_value in line 180. At this point, the server has obtained all necessary data for performing final computation.

After the JSP computing program retrieves the values for constant1 and constant2, it calls the final computing program with all required computation data. The computing program then uses the values and user-submitted data ("37") to conduct final computation (result=37*1.8+32=98.60). After the value is computed, it is associated with result_value by using request.setAttribute("result_value", result) in the JSP program. The JSP program then dispatches the same form by using the following statement:

```
request.getRequestDispatcher(pStr).forward(request,response),
where pStr="form_maker.jsp?record_id =2".
```

The program for conducting final computation and the database-accessing program may be implemented as independent modules which can be called to perform necessary tasks. The computation may be performed by an executable. After the server gets the value of record_id, retrieves computation data such as constant1 and constant2, and retrieves user-submitted data, it constructs a command line and calls the executable. The format of the command line is similar to the command format used on the terminal of Linux systems.

cp.runCommand("LinearEquation 37 1.8 32");

This statement calls the JavaBean command processor to pass the entire string to the executable, LinearEquation, and invokes it. In executing this command, the values are essentially passed into the command-line argument variables: char argv[1]="37", char argv[2]="1.8", char argv[3]="32". The variables values are then converted into doubles: double tvariable1=atof(argv[1]), double tvariable2=atof(argv[2]), and double tvariable3=atof(argv[3]). Finally, LiearEquation conducts the computation using the following mathematical method:

$$result = tvariable1 * tvariable2 + tvariable3 = 37*1.8+32 = 98.60$$

This result is stored in result_value, which is dispatched to the form_maker.jsp. This action is equivalent to updating the same form with a value being assigned to the result_value.

Various implementations arise from the combinations of JSP program (i.e., computing.jsp), the database-accessing program, and the final computing program. The following are some of the different implementations:

1. The JSP program calling one single executable C program that performs both database access and final computation.
2. The JSP program calling one single JavaBean program that performs both database access and final computation.
3. The JSP program calling one executable C program for database access and one executable program for conducting final computation.
4. The JSP program calls one JavaBean program for database access and one JavaBean for conducting final computation.
5. One single program performs the data-accessing, computation, and construction of a responsive web page.

More permutations arise from using Apache CGI C program or Tomcat CGI C program. In addition, Perl scripts may be developed to perform both of the functions thus may replace both of the database accessing and computation programs. Shell scripts may also be used to replace the final computing program. Those additional permutations are obvious. What is important is how data are passed in each of the different arrangements.

An additional field, method-flag, is used as a switch for invoking different computing methods in a final computing program. Use of different values of the method-flag allows a final computing program to implement hundreds to thousands of computing methods. In addition, another field, table_flag, is used as an identification of plural project matrix tables such as linear_matrix, middle_matrix, large_matrix, and special_matrix. In addition, another field, group_id (also known as "unit_flag" or "unit_flag2" in some programs), is used to mark the records with the same group_id as one single project group so that the system can retrieve computing project groups more easily.

If the executable program merely conducts computation and returns the result, the executable does not need the form-making data such as result name, result unit, variable name, and variable unit. It needs constants and user-submitted data. The JSP program that generates the responsive page needs the form-making data to print the form. If the executable program is designed to generate a complete web page, all required form-making data such as the variable name, variable unit, result name, and result unit, and use description must be passed to the executable program so that it can use the form-making data in constructing the responsive computing data input form. The program also needs user-submitted data and computation data from the record to conduct final computation before it can include result on a complete responsive web page.

The computing program for final mathematical computation may be implemented as Servlet or JavaBean program, or a shell program, a system executable, or a CGI Perl or C program as long as it can accept command line arguments or query string. A variety of methods can be used to pass parameters, including the set-method and get-method in JavaBean, command-line arguments in shell program, use of name-value pairs in a query string, and even use of session object where data can be saved.

Using a record_id is not always necessary. The server may use other fields or a combination of fields to find the record. In this case, the combination of the fields is equivalent to a unique record_id value. This web page may also contain other information for improving the appearance. In an alternative implementation, group_id may be used for tracking records.

In another alternative implementation, the server may retrieve all project data such as constants and other project data from the database record in the step of generating the computing data input form and embeds them as the hidden fields on the form. After the user provides data for variables and submits the form to the server, the server has no need to access the database record to get the constants and other required project data for the record. The advantage of this implementation is reducing access to the database table by one time. However, this implementation is not efficient in computing unit conversions involving many user-selectable units. In this case, the string expression of many constants have to be embedded on the form as hidden names and variables. It is also inefficient if the record contains a large amount of constants and other project data.

In still another version of the implementations, the JSP page mainly works as a relay. When it receives a data stream from the browser of the client computer, it extracts data values from the data stream containing the user data (e.g., 37). It then passes all data including the record ID to the executable, which returns the whole page to be forwarded by the JSP program to the client browser.

When the step of accessing project data is implemented in the JavaBean program, all user-submitted data such as variable units, result units and variable values must be passed to the program so that it can use them in finding the computation data for the specific record correspondent to the user-selected variable units and result units. In comparison, if the step of accessing project data is performed by an independent program, the user-submitted data and the record id must be passed to the independent program so that the program can find the record id.

D. Various Back-End Computing Programs

For a Linux server, the final computing program may be a shell program. If the final computing program resides in a search-able path such as /usr/local/bin on a Linux machine, the program can be accessed from a terminal. However, a JSP page cannot directly access such a system program. In order to access such system program, it is necessary to use a JavaBean command line processor, which mainly serves as a middle-man. The command processor, command Processor, java, used in this invention is shown below. When a JSP page calls a final computing program to compute for a project, it needs to know where the program resides. The command processor passes the whole command with arguments to the executable program by using the following code:

```
200.   comstr="/usr/local/bin/"+computing_program+" "+method_flag+"
       "+table_flag+" "+group_id+" "+description+" "+result_unit+"
       "+variable_unit[0]+" "+variablevalue[0];
210.   cp.runCommand(comstr);
220.   result=cp.getOutput( );
230.   error=cp.getError( );
```

The statement in line 200 constructs a string with the program name and a list of command line arguments. "Computing_program" is the name of the program and table_flag is used to indicate the table where the computing record can be found. In this case, the function to retrieve constant1 and constant2 is inside the executable program. The rest of the arguments are self-obvious. The statement in line 210 then runs the Command Processor which invokes the executable with the arguments. The computing_program then starts execution. It first parses the command arguments according to its space delimit. The calling command is like: "program method_flag table_flag group_id description result_unit variable_unit variable_value . . . .". The first 6 arguments are almost identical in all cases, the executable knows where to find variable_unit and variable_value from the command line data. In dealing with more variables, two more arguments:—variable number and result number is used in the arguments: "computing_program method_flag table_flag group_id variable_no result_no" followed by user-submitted data. In this case, use_description is not used, but variable number and result number are used. Since the number of offset is fixed, the executable can determine the precise locations of all variable units values and variable values in the command line. When the server gets user-submitted data, it then gets respective constants from the associated record. Now, the executable conducts computation using the user-submitted data and all computation data from the record.

Variable units and result units are user-submitted data because the user may select different variable units and result units on the computing form. When a project supports many different units, the project must have plural records with different constants. The plural records are grouped as one group by using a unique group ID. When a user selects one set of variable units and result units, computation will be performed using the constants from a correspondent record. If the user chooses a different set of variable units and result units, computation will be performed using different constants from a record consistent with the selected units. That is why the variable units and result units are user-submitted data.

The program returns the result in line 220, command line processor may also return an error message in line 230. After a computation is performed, the JSP computing program will forward the result by the following statements:

```
request.setAttribute("result_value",result);
request.getRequestDispatcher(parameterStr).forward(request,response);
```

A responsive web page shows the computation result. The executable may return only the result or a whole web page. If the executable returns the whole web page containing the computation result in compliance with the HTML Specification recommended by W3C, the JSP program only needs to forward the whole page to the browser. In contrast, if the executable returns only a result (i.e., a float value of the result), the JSP page must use the result to construct a web page. It may be sent to another JSP page for construction of a web page.

In an alternative implementation, the executable program may also perform the task of retrieving database records. The server passes only database record_id and user-submitted data to the final computing program, and let the final computing program retrieve constant1 and constant2 and other required project data from the database record. It then performs a final computation.

When user data points are not defined, additional data coding schema is necessary to pass them in command line arguments. If many data points are passed to the final computing program as command line argument, individual data points must be packed without a space. Three data points (11, 22, 33) may be packed as "11%XX22%XX33" as long as the filler %XX is a unique string which will not be used by the user on data input form. Moreover, a carriage return may be coded into the string as another unique string %##. According to such schema, 11%XX22%##33%YY44 is actually a 2*2 matrix which can be passed as one argument. The same or similar schema can be used by the final computing program in returning plural data points such as a vector of doubles (3.12 2.32 34.5).

Moreover, the final computing program is implemented with a processing routine which can detect the carriage return and determine the column number. Since the two kinds of fillers are unique, the program can find the total number of data points by counting those fillers. The program can copy their string values and assign them to a matrix of double variables after they are converted into doubles. The program can then conduct final computation using the converted data. After a result is computed, the final computing program returns the result alone or together with project data such as variable names, variable units, and use description of computing project to a JSP program for sending a web page on the client browser. Carriage return mark, space mark and tab mark can be replaced by their actual values on the browser on the JSP page before it is rendered. Thus, a result can be a vector or matrix in a large textarea on the responsive web page.

The advantage of the compiled executable is that many generic computing algorithms may be compiled into one program. A single final computing program may support many mathematical methods by using a method_flag in the table linear_matrix. Different value of the method_flag may signal the program to use a different part of the code just like a command line switches used for shell programs in Linux systems. The computing system may also have many programs developed in one or more languages such as shell scripts compiled executable, Perl, BASIC, Java Servlet, and JavaBean. In an online computing system that has 100 programs and 100 generic methods in each of the programs, the system could support 10,000 generic computing methods. Some of the computing methods may be used by millions of database records. Thus, the computing system can handle an extremely large number of computing projects.

Computation capability may be further expanded by using different data source indicated by source_flag. This flag may be added to the linear_matrix table. This source_flag may signal the program to use a different source of data necessary for computing. A number of choices of data sources may be available, and the user can select one of the data sources. This is particularly useful in computing projects that require real-time business data such as currency exchange rates and interest rates. Since banks publish their own exchange rates and interest rates daily, it is highly desirable to use real-time data rather than the data from project records.

The implementation using an executable has an advantage because it can dynamically generate all necessary web pages. In fact, it is easy to write just one C program which is able to perform all tasks: generating first page containing a search box, generating the links in response to a search query, searching database record, retrieving project data from database record, printing a computing data input form, receiving the user-submitted data, accessing database to retrieve project data, and presenting the result to the user. One round of database access may be dispensed with in some cases if the program retrieves project data from a record in the step of making the computing data input form and saves the data in a session object or pass them to the client browser as hidden data for next round use.

One final computing program is a Java Servlet, LinearEquation.java. In this example, a unit_flag is used as group_id. In this version of the embodiment, the computing data input form, upon being submitted, contacts LinearEquation.

```
[import javax.servlet.*; javax.servlet.http.*; java.io.*; java.util.*; java.sql.*; gbp.webdb;]
public class LinearEquation extends HttpServlet{
[Declaration: webdb dbhandler; ResultSet rst; constant1; constant2; unit_flag2;
txtValue;
result; start_unit; end_unit; result_name; description;]
public void init( ) throws ServletException { }
public void doGet(HttpServletRequest request, HttpServletResponse response) throws
ServletException, IOException { doPost(request,response);
public void doPost(HttpServletRequest request, HttpServletResponse response)
throws ServletException, IOException {
    unit_flag2=Integer.parseInt(request.getParameter("unit_flag2"));
    txtValue=Double.valueOf(request.getParameter("txtValue")).doubleValue( );
    start_unit=request.getParameter("start_unit");
    end_unit=request.getParameter("end_unit");
    result_name=request. getParameter("result_name");
    try{
        dbhandler=new webdb("webdb.properties");
        dbhandler.connect( );
        String strDescription = "select use_description1, result_name,
        constant1,constant2 from linear_matrix where unit_flag='"+unit_flag2+"'
```

```
      and "+"variable_unit1='"+start_unit+"' and result_unit='"+end_unit+"'" ;
      dbhandler. retrieve(strDescription);
      rst=dbhandler.getResultSet( );
      while (rst.next( )){
         result_name=rst.getString("result_name");
         description=rst.getString("use_description1");
         constant1=rst. getDouble("constant1");
         constant2=rst.getDouble("constant2");
         result=txtValue*constant1+constant2;
      }
      rst.close( );
      dbhandler.closeConnection( );
      response.sendRedirect("result.jsp result=" + result +"&txtValue="+
      txtValue +"&start_unit=" +start_unit +"&end_unit=" + end_unit +
      "&result_name=" +result_name +"&use_description=" +description);
      return;
      }catch(Exception e) {
      response.sendRedirect("error.jsp?err="+e);}
   }
}
```

In the program, txtValue is a user-provided value for the variable, and start_unit and end_unit are, respectfully, the variable unit and the result unit in the early model system for unit conversion. LinearEquation first uses request.getParameter( ) statements to get the values for group_id, user-input data, variable unit, result name, and result unit. It then instantiates a webdb object for accessing the database record using the value of group_id, variable unit and result unit, and finds the record. From the record, the program retrieves the values for constant1, constant2, and result name. It then computes the result by using the user-submitted data (variable value), constant1 and constant2. It then sends the page back to the result.jsp where a web page is constructed. The JSP program for displaying the computing result may be performed by the following code:

```
<%@ page contentType="text/html; charset=gb2312"
language="java"%>
<%@ page import="java.util.*"%>
<%
String result_name=request.getParameter("result_name");
String description=request. getParameter("use_description");
String end_unit=request.getParameter("end_label");
String start_unit=request.getParameter("start_label");
```

-continued

```
%>
<html>
<body>
<h1>Online Computing Center</h1>
<table><tr>[Navigation menu is omitted]</tr></table>
<%=description%>
The result in computing <%=result_name%>:</h3></b>
<ul><li><h3><b>
<%=request.getParameter("txtValue")%> <%=start_unit%> = <
%=request.getParameter("result")%> <%=end_unit%>
</h3></b></li></ul>
</body>
</html>
```

In this program, the values are passed by a query string. This example shows how the computing data input form, the database accessing program, and the final computing program interacts. This result.jsp does not show code for navigation buttons and does not contain a form tag and action program for recomputing the same project.

Project data may be passed between Java Servlet/any computing program, JSP pages, and web page on the client computer. The record_id, user-submitted data, and project data may be passed by a number of methods described below.

```
Using request.setAttribute to pass name-and-values from Java Servlet to JSP page
as shown below.
   request.setAttribute("result_name", result_name);
   request.setAttribute("start_unit", start_unit);
   request.setAttribute("end_unit", end_unit);
   request.setAttribute("result", result);
   request.setAttribute("txtValue", txtValue);
   request.getRequestDispatcher("result.jsp").forward(request,response);
   The result.jsp page can get their values by the following statements:
   <%=request.getAttribute("result_name")%>
   <%=request.getAttribute("txtValue")%>
   <%=request.getAttribute("start_unit")%>
   <%=request.getAttribute("result")%>
   <%=request.getAttribute("end_unit")%>
```

The second method is using a query_string to pass name-value pairs to a JSP for printing a result page. The Java servlet sends the name-values pairs to result.jsp page by redirect:

```
response.sendRedirect("result.jsp?result="+result+"&txtValue="
+txtValue+"&start_unit="+start_unit+"&end_unit="
+end_unit+"&result_name="+result_name);
```

On the result.jsp (or computing.jsp) page, their values are available for use by using the following statements:

```
<%
    String result_name=requestgetParameter("result_name");
    String result_value=request.getParameter("txtValue");
    String result=request.getParameter("result");
    String end_unit=request.getParameter("start_unit");
    String start_unit=request.getParameter("end_unit");
%>
```

The third method is using a session object to pass values. A session object can be used to keep the client information for a limited amount of time and the server can identify the client computer by using some fingerprint information such as IP address. Thus, if a server program retrieves data from a data record, it can save the data in a session object with a unique label. When the same client browser contacts different program component on the same server, the server can retrieve those values from the session object and use them to build a web page. If a session object is used, the server does not need to send variable values to the client browser if it is not necessary to show the values on web page. A session object may be created inside a Java Servlet as follows:

```
session = request.getSession(true);
session.setAttribute("result_name", result_name);
session.setAttribute("end_unit", end_unit);
session.setAttribute("start_unit", start_unit);
response.sendRedirect("result.jsp?result=
"+result+"&txtValue="+txtValue);
```

The result.jsp gets the values by using the following statements:

```
<%
    String result_name=(String)session.getAttribute("result_name");
    String end_unit=(String)session.getAttribute("end_unit");
    String start_unit=(String)session.getAttribute("start_unit");
%>
<%=request.getParameter("txtValue")%>
<%=request.getParameter("result")%>
```

Another method is to create a JavaBean including the values and pass the JavaBean as a parameter of a request, as shown in the following code:

```
public class resultBean{
    private String start_unit;
    private String end_unit;
    private String result_name;
    public void setStart_unit(String unit){ start_unit=unit;}
    public void setEnd_unit(String unit){end_unit=unit;}
    public void setResult_name(String name){result_name=name;}
    public String getStart_unit( ){return start_unit;}
    public String getEnd_unit( ){return end_unit;}
    public String getResult_name( ){return result_name;}
```

-continued

```
}
Use the JavaBean as a parameter of request.
resultbean=new resultBean( );
request.setAttribute("bean",resultbean);
resultbean.setStart_unit(start_unit);
resultbean.setEnd_unit(end_unit);
resultbean.setResult_name(result_name)
request.getRequestDispatcher("result.jsp?result="+result+"&txtValue
="+txtValue).forward(request,response);
```

The values are retrieved on the result.jsp by using the following statements:

```
<%resultBean resultbean=(resultBean)request.getAttribute("bean")%>
<%
    String result_name=resultbean.getResult_name( );
    String end_unit=resultbean.getEnd_unit( );
    String start_unit=resultbean.getStart_unit( );
%>
<%=request.getParameter("txtValue")%>
<%=request.getParameter("result")%>
```

Finally, the values are in a Javabean, which is passed as one of the parameters of the session object.

```
resultbean=new resultBean( );
session=request.getSession(true);
session.putValue("bean",resultbean);
resultbean.setStart_unit(start_unit);
resultbean.setEnd_unit(end_unit);
resultbean.setResult_name(result_name);
response.sendRedirect("result.jsp?result="+result+"&txtValue="+txtValue);
```

The result.jsp page can get the values by following statements:

```
<%
    resultBean resultbean=(resultBean)session.getValue("bean");
    String result_name=resultbean.getResult_name( );
    String end_unit=resultbean.getEnd_unit( );
    String start_unit=resultbean.getStart_unit( );
%>
<%=request.getParameter("txtValue")%>
<%=request.getParameter("result")%>
```

Among the methods for transferring name-value pairs, a session object is persistent within its life. Thus, it is not necessary to pass all data to the browser unless the data are necessary for the rendering of the web page. This may be helpful when network bandwidth is limited while computation power has a surplus. Some project data in name-value pairs can be stored in the session object for use by the server. If the project data are maintained without using a session object, the server can embed the data on the form as hidden data. When the user sends the form back, the server gets the user-submitted value from a query string if the form is sent by using the GET method or from standard input if the form is sent by using the POST method.

In this prospective embodiment, the computing program may be a separate JavaBean program. The computing data input form may contact a linearEquation.jsp page (or other suitable name such as computing.jsp). This JSP program first gets the values for record_id or group_id, and all of the user's selected variable units. Since the record is unique, there is no need to keep track of other information such as use description, variable name, and result name in the computing data input form. After the JSP page gets those values, it then calls a JavaBean program to access the database table, finds the record, and retrieves all necessary values for constants, variable_name, and result_name. The JavaBean program may get additional information such as use_description from the database record if the information is not saved in hidden fields on the web page. It then passes the values back to the JSP page for use. If the JavaBean package name and class name are known, with id=beanID, then a JSP page can access the class by using: <jsp:useBean id="beanID" class="packagename.classname"/> An example of JavaBeen which only conducts final computation is:

```
public class computingMethod{
private double result;
private double variable1;
private double constant1;
private double constant2;
public double linear(double c1,double c2,double v1){
   constant1=c1;
   constant2=c2;
   variable1=v1;
   result=variable1*constant1+constant2;
   return result;
}
public double square(double c1,double c2,double v1){
   constant1=c1;
   constant2=c2;
   variable1=v1;
   result=variable1*variable1*constant1+constant2;
   return result;
}
public double cube(double c1,double c2,double v1){
   constant1=c1;
   constant2=c2;
   variable1=v1;
   result=variable1*variable1*variable1*constant1+constant2;
   return result;
}
}
```

This program gets variable (i.e., variable value), constant1, and constant2 and conducts computation and returns the computed result. It has the ability to accommodate a plurality of the computing methods in a program as long as they require one variable and two constants. The JavaBean program may also implement plural computing methods by using a method_flag. This program does not perform the function to access the database table.

The online computing system may be built and enabled by using one or more CGI C/C++ programs in conjunction with a database application. In many versions of Tomcat, one cgi-bin folder is allowed. A CGI program may be built and compiled in two ways. The program may be compiled using a conventional method using int main(argc, argv[ ]). It can be written to accept a certain number of command line arguments to be held in the argv[ ]. A plural arguments may be passed into the CGI program. The result may be found from its standard output. Moreover, argv[0] may accept program name while argv[1] may be used to accept a name-value pairs string. Therefore, multiple data points may be passed to the CGI program.

In the alternative implementation, a CGI program may be written using a CGI library such as cgic lib published by Thomas Boutell (CGI Programming in C and Perl, Addison-Wesley Developers Press). When such a library is used, the cgimain( ) is used to replace main(argc, argv[ ]). This library allows the user to extract name-value pairs from a query string or standard input easily. In this case, the program name and argument can be passed only as name-value pairs as in the following format: "http://www.occhost.com/CGI_program?record_id=2&variable_value=37".

Since the CGI program can run directly under a JSP container such as Tomcat, the method described above for executable is equally applicable. The JSP form page receives user-submitted data, extracts values from an incoming query string or standard input, and uses the record_id to access the database record, and gets computation data such as constant1 and constant2. It then builds a calling string for calling the CGI program. If a CGI program accepts command line argument, the command Processor package may be used under Tomcat so that a JSP page can call such a program to get computation result.

A CGI program may be called directly from the computing data input form page. In this case, the CGI program can get the user-submitted data and other embedded data such as group id and record id from the form. The CGI program then uses the data to find the correct record and retrieves computation data from the record. After the result is computed, the result_value is assigned with a string value, then, the CGI program returns the result to the same form_maker.jsp page for rendering. If the container JSP program does not allow this, the CGI program may be programmed to generate a complete web page to display the final result. It may use the same computing data input form.

Regardless of which implementation method is used, the code for generating those four pages of web forms is straightforward. If C is used, it just uses a series of printf command to print the HTML code for the web page. It requires some API library for accessing the database. The details depend upon the database application. If Perl script is used as a CGI program, the program prints the web form using a series of printing command.

If the online computing system is run under a JSP container such as Tomcat, it may use a number of computing programs by using following plural condition statements:

```
300.   <jsp:useBean id="cp" class="cptest.commandProcessor" />
310.   <jsp:useBean id="bean Program" class=
       "handbook.computingMethod"/>
320.   <%
330.   If (computing_program.equals("ExcutableProgram")){
340.   String result;
350.   String comstr=computing_program+ " "+method_flag +
       " "+constant1+ " "+constant2;
360.     cp.runCommand(comstr);
370.     result=cp.getOutput( );
380.   }
390.   else if (computing_program.equals("ComEquation")){
400.   String result;
410.   if(method_flag=="1000"){
420.   result=beanProgram.linear( );
430.   }
440.   else if(method_flag=="1100"){
450.      result=beanProgram.square( );
460.     }
470.   }
480.   else if(computing_program.equals("CGIProgram")){
490.   String result;
500.   String comstr=computing_program+ " "+method_flag +
       " "+constant1+ " "+constant2;
510.   cp.runCommand(comstr);
520.   result=cp.getOutput( );
530.   }
540.   else if(computing_program.equals("CGIProgramLib")){
550.   String result;
560.   String comstr="http://www.occhost.com/cgi-bin"+
       computing_program + "?"+ "method_flag=" + method_flag +
       "&constant1="+ constant1+ "&constant2="+ constant2;
570.   ....
580.   ....
590.   ....
600.   }%>
```

By using such model code, the computing system can use a number of existing computing programs with different methods. The code statements show only the logic but contain no details on database-access and the processing of computation data. It first includes two JavaBean programs: cptest.commandProcessor, and handbook.computingMethod. It uses the conditional statements to determine which final computing program to use. If the computing data input form calls "ExcutableProgram", it constructs a command line including a method_flag and calls the executable from line 330 to line 360. Result is returned in line 370. If the computing data input form calls "comEquation" in line 390 to line 470, it then checks the value of method_flag. If the method flag is "1000", it calls computingMethod.linear( ) and if the method flag is "1100", it calls computingMethod.squre( ) method. In this code, the values of method_flag are for illustration purpose and not correspondent to the values in Tables 11, 12. Also, no details on passing parameters are included. Result is returned in line 370. If the computing data input form calls "CGIProgram" from line 480 to line 510, it returns computed result in line 520. Finally, the code statements call CGIprogramLib from line 540 to line 590, it constructs a URL to calls a CGI programLib which directly sends a result page. The code of commandProcessor is shown below:

```
public class commandProcessor {
private String command;
private StringBuffer error;
private StringBuffer output;
private int timeout;
private String outfile;
public commandProcessor( ) {
setTimeout(2000);
Outfile="";
}
public commandProcessor(String inputCommand) {
    command = inputCommand;
    setTimeout(2000);
    outfile="";
}
public commandProcessor(String inputCommand, int time) {
    command = inputCommand;
    setTimeout(time);
    outfile="";
}
public void setTimeout(int time) {timeout = time;}
public void setOutfile(String file) {outfile=file; }
public void setCommand(String inputCommand) {command = inputCommand;}
public void runCommand(String inputCommand) {
    command=inputCommand;
    runCommand( );
}
public void runCommand(String inputCommand, int time) {
    command=inputCommand;
    setTimeout(time);
    runCommand( );
}
public void runCommand( ) {
    output = new StringBuffer( );
    error = new StringBuffer( );
    try {
      Process proc = Runtime.getRuntime( ).exec(command);
      BufferedReader outputReader = new BufferedReader(
      new InputStreamReader(
      proc.getInputStream( )));
      BufferedReader errorReader = new BufferedReader(
      new InputStreamReader(
      proc.getErrorStream( )));
      String line = null;
      while ( (line = outputReader.readLine( )) != null) {
        output.append(line);
        output.append("\n");
```

-continued

```
      }
      outputReader.close( );
      while ( (line = errorReader.readLine( )) != null) {
        error.append(line);
        error.append("\n");
      }
      errorReader.close( );
      if(outfile.length( )>0) { waitForOutputFile( ); }
}
    catch (IOException ioe) {error.append(ioe.getMessage( )); }
}
void waitForOutputFile( ) {
int times=timeout/100;
int counter=0;
while (!(new File(outfile)).exists( )&&counter<times) {
    try { Thread.sleep(100);}
    catch (Exception e) { error.append(e.getMessage( ));}
    counter++;
    }
}
public String getOutput( ) { return output.toString( ); }
public String getError( ) { return error.toString( ); }
}
```

This program serves as a bridge between the JSP program and the executable. Its purpose is to call the executable by using a command line argument and get computed result in a data string from the executable.

If a user is provided with detailed information about the program names and their method_flag values for all computing methods, the user can add new project records from a browser using suitable existing programs and computing methods. In addition, the system also provides an image for each of the mathematical equations. Each image shows the locations of all constants and all variables in the equation. The user can easily know which constants should be assigned with what values, and how all variables appear in the project record. The variables order in the project record is the same as the variables order on the computing data input form.

E. Computing System without Using a JSP Container

The entire program running the online computing system can be written in CGI C or Perl. Thus, a large volume of existing C programs such as numeric methods algorithms can be readily used for computation needs.

The server has four CGI programs: Program_one, Program_two, Program_three and Program_four. When the Program_one is called, it generates a search box similar to the page in FIG. 1A. When the user types in one or more search keys and submits the form to Program_two on the server, Program_two then receives the form, extracts their values, and uses the search keys to conduct a search in the database table. When it finds a record, it constructs a link using the use_description field data and record_id (similar to the page in FIG. 1B). When the user clicks on the hot link, the browser contacts Program_three for computing data input form similar to the page in FIG. 10. Program_three uses the record_id to find the database record, and retrieves the project data from the database record. It then prints the computing data input form. The user then types in data, and submits the form to CGI Program_four. Now, Program_four receives user-submitted data and the record id from hidden fields, uses them to retrieve computation data such as constant1 and constant2, and uses them to compute the result. Program_four then constructs a web page containing the project use description together with the result, and sends the page to the browser at the client computer similar to the page in FIG. 1D. For the same reason stated, the server may avoid accessing the database if it retrieves all necessary computation data and saves them in a session object or embeds it on the computing data input form as hidden data. This whole progress can be used, regardless of operating system types and hardware types of computers. Since all forms used in the system are simple, their compatibility with client browser can be easily met.

All of the four CGI programs can be combined into one program. The program must keep track of the state of user's action or the sequence of web pages for each of the users on the system. The user state data may be kept on a structured data in a vector in system memory just like a session object in Tomcat. The first time when it is called, it produces a search box as default. When a search key is provided, but no value is found for any variable, it executed the code for generating the page containing all hits. If the program detects a record-id value but no value of variable name from the incoming data string, it then runs the code for generating the computing data input form. If the program detects a value of a variable from the incoming form, it then runs the code for computing the result and generating the result page. In this case, IP address and user-account may be used in each access to identify users.

A unified program may add a page indicator (e.g., computation step indicator) to keep track of computation stages. The page indicator is used to signal which part of the code in one single program to run without using complicated logic. This page indicator can be printed on any of the series of forms as hidden data. When the program generates a search box at default, it includes the page indicator with the value of 1. If the program receives a form and finds the page indicator of 1, it generates a link with a hidden page indicator whose value has been increased by 1 unit. When the program receives another submitted page and gets the value ("2") for the page indicator, it runs the code for printing computing data input with the page indicator value of 3 in a hidden field. If the program receives a page with the page indicator of 3, it conducts computation and sends a final result with the page indicator of 4 in a hidden field. The program will not increase page indicator further for subsequent responses so the user can submit the same form for re-computation. The program must be able to keep track of each of the active users and their URLs, and must be able to reset the page indicator to 1 when the same user starts with a new search.

Substantially, the same process can be used in Perl together with a database application. One difference is that Perl, as an interpretive language, does not need compilation of the code.

F. Methods of Conducting Multiple Unit Conversions

Many quantities such as length and pressure have many units which are inconvenient to convert from one to another. Pressure has many units which are used by different people. Some of them are PSI, atmospheres, inch of mercury, mm of mercury, and feet of water. The method described above can be used to convert units. However, it is still inconvenient to use. It would have to produce many entries or links on a search result page. If a quantity has four units, it would have 12 possible paired conversions. This could use up a lot of display space on the search result page. It also requires 12 project records.

It would be nice to display only one link which can lead to a computing data input form allowing the user to select any of the possible choices. Referring to FIGS. 3A 3B, after conducting a search using "length", the system generates two links 3 in FIG. 3B. The top link comprises two links separated by a "/". When the user clicks on the top link, the server opens two computing data input forms in FIG. 3E. Multiple units may be produced in a drop-down box on the computing data input form like the one shown in FIGS. 3C and 3D. This form allows the user to select an initial unit and a final unit from two-list units. The displayed unit in FIG. 3C is kilometers, it was changed into meters after the user made a selection (FIG. 3D). After the user types in data and submits the form, the server computes to get a result. If the user wants to do a different conversion using a different start unit or different end unit, the user just changes the unit. The user can use the top form 13 and bottom form 14 in FIG. 3E to convert units. For example, when the user types "2.54" in the variable value box in the bottom form 14 of FIG. 3F and presses the "Compute" button below, the server sends back the same computing data input form containing "1" in the result value box. For this type of computation or unit conversion, the method may be implemented as follows:

Step 1: Creating a Database Table and Project Records for the Project Group

TABLE 4

Database table for one-variable computing projects

| Fields | Types | Fields | Types |
| --- | --- | --- | --- |
| record_id | int unsigned | variable_name | varchar(20) |
| group_id | int unsigned | variable_unit | varchar(20) |
| search_key1 | varchar(50) | result_name | varchar(20) |
| search_key2 | varchar(50) | result_unit | varchar(20) |
| use_description1 | varchar(200) | constant1 | float |
| computing_program | varchar(20) | constant2 | float |
| method_flag | int | source_flag | tinyint |

In an example of conducting three-unit conversions, part of the matrix values may be as follows:

TABLE 5

First part of project data for three-unit conversions

| Fields | Record Values | Record Values | Record Value |
| --- | --- | --- | --- |
| record_id | 20 | 21 | 22 |
| group_id | 20 | 20 | 20 |
| search_key1 | pressure | pressure | pressure |
| search_key2 | A, B | A, C | B, A |
| use_description1 | (Title) | (Title) | (Title) |
| computing_program | LinearMethod | LinearMethod | LinearMethod |
| method_flag | 1050 | 1050 | 1050 |
| variable_name | pressure | pressure | pressure |
| variable_unit | A | A | B |
| result_name | pressure | pressure | pressure |
| result_unit | B | C | C |
| constant1 | c1 | c1 | c1 |
| constant2 | c2 | c2 | c2 |
| source_flag | (Not used) | (Not used) | (Not used) |

Unit conversion follows linear equation $Y=a*X+b$. Both X and Y are pressure except that they have different units (result_unit may also be referred as to result_label in program code.) The fields are named in general terms so their names may be instructive in all possible computing applications. Many computing projects have a similar number of the names, units, and descriptions.

The number of records in the above table is not a complete set of all possible conversion possibilities. For three units conversions: it would have 6 possible ways: A→B, A→C, B→A, B→C, C→A, C→B. For a conversion method involving four units, there would be 12 possible pairwise conversions. For each of the conversions, a record must be created. The remaining records for this example are as follows:

TABLE 6

Additional project data for three-unit conversions

| Fields | Record Values | Record Values | Record Values |
|---|---|---|---|
| record_id | 23 | 24 | 25 |
| group_id | 20 | 20 | 20 |
| search_key1 | pressure | pressure | pressure |
| search_key2 | B, C | C, A | C, B |
| use_description1 | (Title) | (Title) | (Title) |
| computing_program | LinearMethod | LinearMethod | LinearMethod |
| method_flag | 1050 | 1050 | 1050 |
| variable_name | pressure | pressure | pressure |
| variable_unit | B | C | C |
| result_name | pressure | pressure | pressure |
| result_unit | C | A | B |
| constant1 | c1 | c1 | c1 |
| constant2 | c2 | c2 | c2 |
| source_flag | (not used) | (not used) | (not used) |

Step 2: Searching Database Table and Constructing Links Responsive to a Search

The first user's action in using the online computing system is to conduct a search using the form shown in FIG. 3A. The purpose of conducting the search is to find all records that are responsive to keywords. There are various rules to determine if a record is responsive to keywords. The most important search method used in this system is just to search the values in the search-key1 field of all records in the database table using the keywords the user has provided. If a user types in "temperature," and a record has "temperature" in the search-key1 field, this record is responsive to the search. A second search field ("search-key2") is used as secondary search field. If no record is responsive to the user-provided search key, it then searches the values in the search_key2 of all records in the table, and constructs responsive links. In this case, a complete match is not required. Thus, the keyword "term" would retrieve a record whose search_key2 holds "temperature".

If the program conducting the search finds the keyword "pressure", it also uses the value of the group_id and method_flag in constructing responsive links. Group_id is used to identify the records that are tied to one particular group. Within a group, if some records have a value in the use description field while other records within the same group have a different value in the use description field, the link is constructed with both use description values jointed by a slash sign (The third to fifth links on FIG. 1B and the first link on FIG. 3B). The link is constructed according to the following rule:

If only one record has a unique group_id value, the link is constructed using the use_description and the record_id as a query string.

If plural records have the same unique group_id value and all records have same description, the use description value and group_id are used to construct a query string for a responsive link.

If plural records have the same unique group_id value, and some of them have a value of use description while other records have a different value of use description, two links with two use description values are jointed by "/" sign without duplicates to form a query string.

For the pressure example (Tables 5, 6), the program finds all records with group_id=20. It finds all 6 records. The program, however, needs to print only one responsive link together with other responsive links, if any. This generated link contains only group_id and the value from the use description field such as "Convert length between two International Units." (FIG. 1B.)

Step 3: Construct Computing Data Input Form in Response to a Click on a Found Link When the user clicks on a link containing a hidden group_id value, the server uses the group_id and use description to retrieve all project records. The form will be constructed according to the following rules.

(a). The General Rule of Making a Computing Data Input Form

If all records within the group_id have the same use_description value, variable_no and method_flag, it generates only one computing data input form. If they have plural records with different units, all units are placed in a drop-down menu in the variable unit boxes and result unit boxes. This can be shown in the following two examples:

The first example is the construction of data input form for the pressure conversion example. The form_maker.jsp constructs a single data input form, the server reads the group_id value 20 and the use_description value from the calling query string ("form_maker.jsp?group_id=20") originated from clicking the responsive link. It conducts a search to find all records within the same group_id. From a search result, the server goes through all records, and gets the values from the variable_unit field for the records 20-25. Thus, the server gets the value: A, A, B, B, C, and C. After rejecting the duplicate values, it keeps A, B, and C. Those values are used as the list items for both the drop-down boxes. The variable name (e.g., "pressure") and result_name (also "pressure") are used to display the variable and result in the computing input data form.

Since the units in the drop-down box for the variable unit can be combined with any of the result units, the database table should include all unit pairs combinations of records. For a pressure conversion involving 4 units, it has 12 possible conversions. Each of the n variable units may be converted to (n−1) units, thus the total number is n*(n−1)=12.

The second example shows how to build plural computing data input forms (FIGS. 3E, 3F). The computing project example is for length conversions. Two drop-down boxes are used, one for variable units and one for result units. Use description, which is also the subtitle, is used to identify two subgroups. The group_id indicates that records 40, 41, 42, 43, 44, 45, 46, and 47 are in one group, but the values of user_descriptions for the records 40, 41, 42, 43 are identical while the values of user_description for records 44, 45, 46, and 47 are identical. The two subgroups are shown in the following table.

TABLE 7

One project group containing two subgroups

First subgroup
Use_description: Convert length from British to International units

| Record Id | British Units | International Unit | Constant |
|---|---|---|---|
| 40 | Inches | Centimeters | c1 |
| 41 | Feet | Meters | c2 |
| 42 | Yards | Meters | c3 |
| 43 | Miles | Kilometers | c4 |

Second subgroup
Use_description: Convert length from International to British Units

| Record Id | International Units | British Units | Constant |
|---|---|---|---|
| 44 | Centimeters | Inches | c5 |
| 45 | Meters | Feet | c6 |
| 46 | Meters | Yards | c7 |
| 47 | Kilometers | Miles | c8 |

The two subgroups may have different numbers of project records. If the values of use description for all records are same, all project records would be treated as one group. In this case, a broad use description such as "Converting length among four units" should be used to encompass all conversion projects. This example does not include all conversion combinations. For example, no data record is available for a conversion between inch and meters.

If a search using a group_id value, a use_description value, and a variable_no value to find non-repeating records results in N entries (each entry may have plural records), the form_maker will make N input forms. In practice, many computing data input forms may be constructed together. By using same group_id value but different use description and different variable no (thus different method_flag value), plural related computing projects are constructed as one link and plural computing data input forms may be constructed for the user to choose in computation.

(b). The Rule for Making a Computing Data Input Form for Successive Conversions

One special kind of computation projects is successive unit conversions. For example, length has the units: kilometer, meter, centimeter, millimeter, and micrometers. A value of length can be converted from any unit to a smaller one by multiplying a correspondent constant. Length in kilometers can be directly converted to micrometers, by multiplying all of the constants, c1, c2, c3, and c4. By using the normal computing data input form that requires one record for each possible unit conversion, the server would require a large number of project records because any of the units may be converted to any of the rest of N−1 units. Therefore, it is desirable to construct a computing method (also known as form for the method 1051) that takes advantage of the successive conversion principle. The rule can be summarized as follows:

If the project records are constructed from a largest unit to a smallest unit and each of the two neighbor units are convertible by a constant, the number of entire possible variable units are total number of conversion step plus one. Therefore, the units the form_maker must use are all variable units plus the smallest result unit, or all result units plus the largest variable unit.

Assuming that the chain conversion is kilometer→meter→centimeter→millimeter→micrometers, the total number of conversion constants is c1, c2, c3, and c4. However, the total units for the user to select in both the variable unit box and the result unit box is 5.

TABLE 8

A project group involving successive unit conversions

| Variable Unit | Constant1 | Result Unit |
|---|---|---|
| kilometer | c1 | meter |
| meter | c2 | centimeter |
| centimeter | c3 | millimeter |
| millimeter | c4 | micrometer |

In order to allow the user to select any of the unit pairs in this range, all five units must be extracted by the form_maker program. The computation method for conducting unit conversion between any of the five units is obvious and its implementation in the final computing program is discussed later. If the conversion chain is written in a reversed order, the rule can be modified accordingly. For a given online computing system, only one convention chain is necessary. A different method_flag may be used to signal a computation going through a reverse conversion chain.

When the form_maker program finds that the method_flag for such a group, the program gets all variable units and the smallest result unit. Alternatively, it could get all the result units and the largest variable unit. This form is known as 1051 data input form. In all other cases, the form_maker catches all variable units to be displayed in the drop-down variable unit box and all result units in the drop-down result unit box. One example of this 1051 data input form for length conversions is shown in FIGS. 3C, 3D. A user has selected a different unit on the result unit box in FIG. 3D in conducting a conversion.

The above implementation is preferred, but there are many different ways to construct a computing data input form. If all records are provided for every computation required by any unit combination, the program extracts variable units and result units according to the default rule. Whether group_id is unique affects how the server retrieves project records. When group_id is unique as in the preferred embodiment, the group_id value must not be used by a record that is not a part of the group.

Since the variable_name and result_name are common variables used in all computing jobs, it is unnecessary to have them included in project records. The program can use suitable variable names to represent them. However, they are useful in the construction of the computing data input form and the result page. The result name can be specifically spelled out by words like "temperature" or "pressure". Variable name and result name may be used as search fields in advanced search. An example of advanced search is shown in FIG. 4A.

In the computing data input form, the user may choose any of the available units in the variable-unit box, but they may mistakenly select the same unit. Such conversion is meaningless. A JavaScript may check the unit values to ensure that the user has selected proper units, and issues a warning or prevents the user from submitting the form if the user selects two identical units.

Step 4: Conducting Final Computation for One Variable Cases

After the user has typed in a value and selected variable_unit and result_unit, the user then clicks on the "Compute" button to submit the form to a JSP computing program. The JSP program calls the final computing program, LinearEquation, for computation. In the simplest implementation without using group implementation and drop-down unit boxes, LinearEquation first gets the record_id or group_id, retrieves the value of constant1 and constant2. It then gets values for the user-submitted data. The program then conducts the final computation.

In the preferred embodiment which supports project grouping, LinearEquation, first gets all records with the same group_id value, and gets values for all user-submitted data: value of the variable, the variable unit, and the result unit. The program then finds the only record_id having the same group_id, the same variable unit, and the same result unit. The program also checks method_flag value which may signal the program to conduct computation according to a special rule.

The default rule is that the program compares the user-selected variable unit and result unit with the values of variable_unit and result_unit from each of the records within the group_id. In this case, one valid database record should exist for user-selected variable unit and result unit. If a record matching the user-selected unit combination does not exist, computation cannot be performed. When the record is found, the server gets the computation data (the values of constant1 and constant2) and uses them and the values of the variable to conduct final computation.

This requirement of project record corresponding to user-selected data is equally applicable to a group that contains plural subgroups of records arising from different values of use description.

For an ordinary computing project, the total number of records necessary is the simple product of the variable unit number and the result unit number. If all records are provided, the user can find any variable unit and result unit combination by using the drop-down menu. In the example in Table 7, the user has 4 choices for each of the two subgroups, which do not have all possible records. If the database table does not contain a record for a particular pair of units, the system will not be able to return a result. In this case, it is desirable to provide an error message, informing the user that project data for a particular conversion are unavailable in the computing system. To avoid this problem, the group should contain all necessary conversion combinations.

Computation by using a variable unit from one record and using a result unit from a different unit (e.g., from Inches to Meters) can be performed by using special computation method ("method 1052"). This method of conversion is implemented for converting units by using one constant that defines the quantitative relationship between a variable and a result, at least one constant that defines the quantitative relationship between the two units of the variable between two neighboring project records, and at least one constant that defines the quantitative relationship between the two units of the result between two neighboring project records. An example is the conversion of distance from a British unit (mile, yard, feet, and inch) to an International unit (kilometer, meter, centimeter, and millimeter). The conversion for the largest units (from mile to kilometer) is defined by constant C. Table 8 shows that relationship between any two neighbor units for kilometer, meter, centimeter, and millimeter is defined by c1, c2, c3, c4, and likewise the relationship between any two neighbor units for mile, yard, feet, and inch is defined by d1, d2, d3, d4. Therefore, a conversion between any two units cross the two unit system can be done.

The special case involving successive conversions has been discussed in the context of making a computing data input form. The example project in Table 8 involves five units: kilometer, meter, centimeter, millimeter, and micrometers. It is desirable to have computing data input form that allows the user to convert units between any two of the available units. The final computing program is written with the capacity of conducting all possible pairwise conversions. If the first record with c1 is regarded as the start unit, this project has four conversions (N=4) in total. To convert length from the unit kilometer to Nth unit, the result can be achieved by successively multiplying the original length by constants c1, c2, c3 and c4 from 1 to Nth constants. For example, length-in-kilometer*c1*c2=length-in-centimeter (a 2 steps conversion). To conduct a reverse conversion from the smallest unit to the largest unit, if the last record is regarded as the first conversion with the maximum of four conversions, the result may be achieved by dividing the original length successively by the constant c4, c3, c2, and c1. For example, length-in-micrometer/(c4*c3)=length-in-centimeter (a 2 steps reverse conversion). A final computing program capable of this unique method is invoked by method_flag=1051.

G. Computing Projects Using Multiple-Variable Functions

It is straightforward to expand the method to multiple variables cases. The only thing to be changed is the number of fields in the database table. Assuming that the task is to compute the result for the function:

$$Y=f(X1,X2)$$

Where a list of constants c1, c2, . . . cn may be used in the generic equation. A database table may be created for this general method.

TABLE 9

A database table for two variables projects

| Fields | Types | Fields | Types |
|---|---|---|---|
| record_id | int unsigned | variable_unit1 | varchar(20) |
| group_id | int unsigned | variable_name2 | varchar(20) |
| search_key1 | varchar(50) | result_name | varchar(20) |
| search_key2 | varchar(50) | Result_unit | varchar(20) |
| use_description | varchar(200) | constant1 | float |
| computing_program | varchar(20) | constant2 | float |
| method_flag | tiny int | constant3 | float |
| variable_name1 | varchar(20) | constant4 | float |
| variable_unit2 | varchar(20) | source_flag | tinyint |

This table may be useful for applications using many mathematical equations. For example, it may hold project data for computing projects using the following equation:

$$Y=c1*X1+c2*X1*X2+c3*X2+c4$$

When c2=0, the equation becomes Y=c1*X1+c3*X2+c4. When c2 and c3 both are zero, it is reduced to a linear equation. When X2 is zero, it is also a linear equation. If X2 is a constant, the equation becomes Y=d1*X1+d2, where, d1 and d2 are transformed constants. The linear equation discussed in the first embodiment is a special form of this two-variable method.

This database table is similar to the linear_matrix table discussed above. It has a user_description field. When a search hits it, the server prints a link using the use description and the record_id values. When the user clicks on the link, the server generates a computing data input form for the user to enter data. The data required are values for X1 and X2 and the units for X1 and X2. The user may be allowed to use multiple unit options.

The only difference is the number of the input boxes on the computing data input form because it now has two input boxes with two units. It is interesting to know how many records are necessary as a result of multiple units. If the form accepts one unit for each of the variables, then, only one record is necessary. It is expressed in the constant values:

$$X1\ X2(c1,c2,c3,c4)$$

However, if X1 has only unit A and X2 has two units, C and D, then there are two ways of computation, respectively using two sets of constants:

$$X1-A\ X2-C(c1,c2,c3,c4)_1$$

$$X1-A\ X2-D(c1,c2,c3,c4)_2$$

Where, -A, -C, and -D mean the units for the variables X1 and X2. As shown above, many unit conversions can be done by multiplying a constant. In other words, if the user enters an improper unit for the variable X1 with respect to the user-selected unit for the result Y, the server must "correct" improper unit through the constants. The number of the constants which must be corrected depends upon how many places the variable X1 appears. If X1 appears only in one place, then only one is corrected. If X1 appears in all places, all constants need to be corrected.

If X1 has two selectable units (A and B) and X2 has two selectable units (C and D), then it would require four sets of different constants:

$$X1\text{-}A\ X2\text{-}C(c1,c2,c3,c4)_1$$

$$X1\text{-}A\ X2\text{-}D(c1,c2,c3,c4)_2$$

$$X1\text{-}B\ X2\text{-}C(c1,c2,c3,c4)_3$$

$$X1\text{-}B\ X2\text{-}D(c1,c2,c3,c4)_4$$

Where subscriptions of 1, 2, 3 and 4 mean that they have different values at least in one of the constants. A sample project having four project records is shown in Table 10.

The multiplicity of constants sets in a computing project like this can still be implemented using the method proposed for multiple unit conversion. The computing operation is transparent to the user interface: the computing data input form. Result may be printed on a new computing data input form so that the user can change the values, select different units, and resubmit the form for recomputing. Two things need to be modified. The LinearEquation is no longer adequate for many computing projects. Therefore, s2vp (or any suitable name), which can accept two variables and has generic methods for computing non-linear equations, is used to perform the job. The other difference is that this computing data input form has more variables and the final computing program uses more variables and more constants. The computing data input form has two input boxes, each followed by a unit selection box. Since some variables and constants may be zero or null, this version of the computing system can also compute linear problems.

TABLE 10

| Project records for a two-variable group | | | | |
|---|---|---|---|---|
| Fields | Recd Value | Recd Value | Recd Value | Recd Value |
| record_id | 30 | 31 | 32 | 33 |
| group_id | 30 | 30 | 30 | 30 |
| search_key1 | Y | Y | Y | Y |
| search_key2 | NA | NA | NA | NA |
| use_description1 | omitted | omitted | omitted | omitted |
| computing_program | ComMethod | ComMethod | ComMethod | ComMethod |
| method_flag | 1000 | 1000 | 1000 | 1000 |
| variable_count | 2 | 2 | 2 | 2 |
| variable_name1 | X1 | X1 | X1 | X1 |
| variable_unit1 | A | A | B | B |
| variable_name2 | X1 | X2 | X2 | X2 |
| variable_unit2 | C | D | C | D |
| result_name | Y | Y | Y | Y |
| result_unit | omitted | omitted | omitted | omitted |
| constant1 | [c1] | [c1] | [c1] | [c1] |
| constant2 | [c2] | [c2] | [c2] | [c2] |
| constant3 | [c3] | [c3] | [c3] | [c3] |
| constant4 | [c4] | [c4] | [c4] | [c4] |
| source_type | omitted | omitted | omitted | omitted |

This table can be used in many two-variable generic computing methods. Some computing methods may use the following equations:

$$Y=c1*X1+c2*X1*X2+c3*X2+c4$$

$$Y=c1*X1+c2*X1/X2+c3*X2+c4$$

$$Y=c1*X1*X1+c2*X2$$

$$Y=c1*X1*X1/(c2*X2*X2)+c3*X2+c4$$

$$Y=c1*X1*X1*X2*X2+c2+X1*X1+c3*X1+c4*X2$$

There are a lot more possible equations. In theory, it may include all equations that could be addressed in mathematics. In reality, most of them are not useful. Even though the equations may be complicated, the code required for making such generic computation is simple in most of the cases. Many of them need only a few lines of code added to an existing final computing program. Thus, a plural generic methods may be put into one simple program. When multiple methods are coded in the same program, different method_flag values are used as signals for invoking different methods. Each of the algorithms implementing the computing methods should check for impermissible value ranges such as zero in denominator and negative value in log(X). It normally would be obvious when a computing equation is under consideration. If a project is offered and uploaded by a user, the user normally knows both practical limits and theoretical limits of variables.

The computation method can be extended to multiple variable applications. Suppose that computing projects follow the following general function:

$$Y=f(X1,X2,X3,X4,X5,\ldots Xn)$$
$$\text{with } c1,c2,c3,c4\ldots cm$$

The computing system may be implemented as follows:

1. Create a database table for holding plural constants c1, c2, c3, c4 . . . cm. For practical application, a database table cannot have an infinite number of variables. The largest table used in this system is the large_matrix table in Table 11 below.

2. For a given project, add constants values in the record.

3. Add a descriptive word or phrase in the first search field and possibly more in the second search field.

4. Add actual variable names to variable_name1, variable_name2, variable_name3 . . . variable name-n to the extent necessary.

5. Add actual unit names to variable_unit1, variable_unit2, variable_unit3 . . . variable unit-n to the extent necessary.

6. Create the program for generating first search box, the link page, the computing data inputting form, and the result page. The computing data input form for X1, X2, X3, X4, X5, . . . Xm variables should be similar to the page shown in FIG. 4C except that it contains more input boxes. If multiple units are used for one or more variables, the group_id is used to indicate that they belong to a group.

7. It is preferable that a separated JavaBean is developed to perform the function of finding project record and retrieving project data.

8. Add a final computing program name to the computing program field in the table. If the final computing program has plural computing methods, add method_flag value in the record so that it signals the program to use a right computing method. In the alternative, the JavaBean Command line processor is used in the computing.jsp or result.jsp page for interfacing with shell programs or other executable. The result.jsp should be able to assign variables correctly.

9. Recreate the result page which is just an updated computing data input form. It displays the last computing result in the result boxes. All input boxes are filled with user-provided data and all drop-down boxes are displayed with the units the user has selected.

Figure 5A:
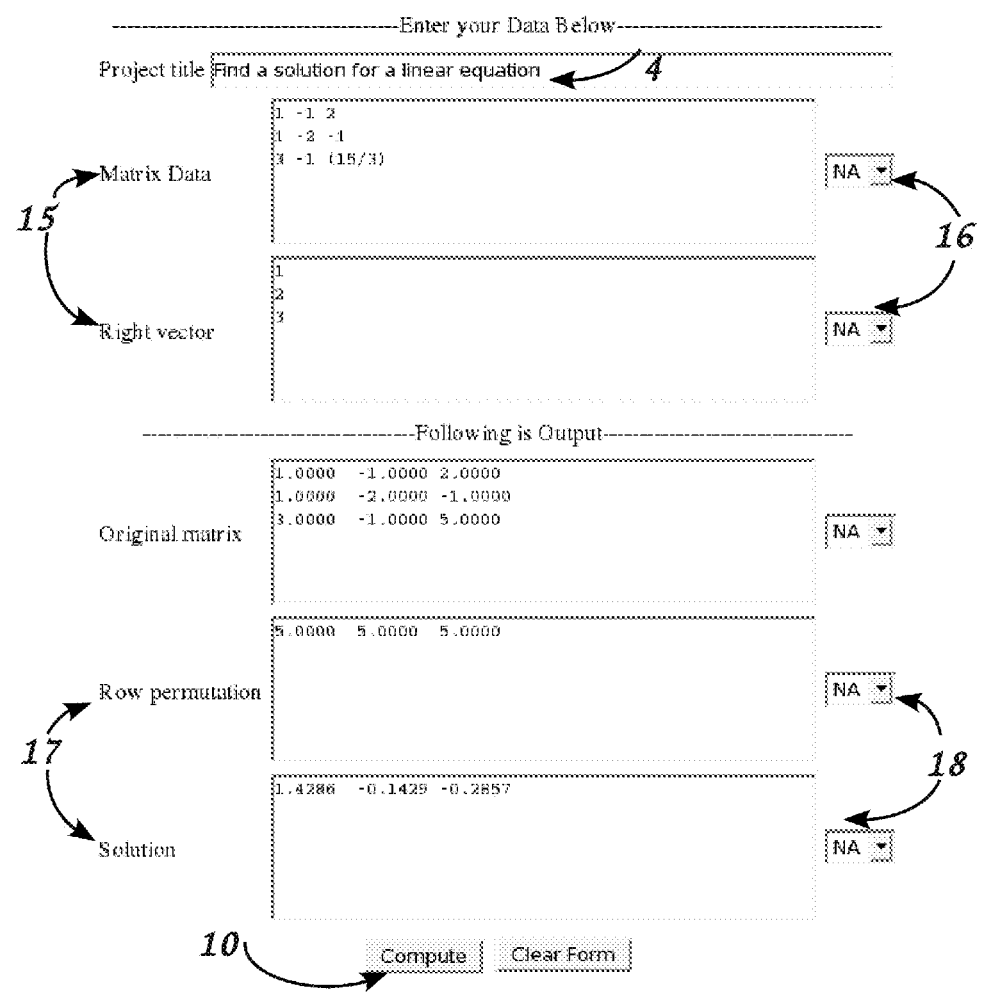

The preferred version of the computing system has four database tables: linear_matrix, middle_matrix, large_matrix, and special_matrix. Their variable number/constant number/result number ratios are respectively 1/2/1, 4/8/1, 8/12/1, and 8/8/15. The special_matrix is unique in that it has 15 result names and associated result units, and it is used to store computing projects in statistics (FIGS. 5B, 7) and linear equations (FIGS. 5A,7). This is the table that contains a result number field.

TABLE 11

A database table, large_matrix, for 8 variables and one result

| Fields | Types | Fields | Types |
|---|---|---|---|
| record_id | int unsigned | variable_unit5 | varchar(20) |
| group_id | int unsigned | variable_name6 | varchar(20) |
| search_key1 | varchar(50) | variable_unit6 | varchar(20) |
| search_key2 | varchar(50) | variable_name7 | varchar(20) |
| use_description1 | varchar(200) | variable_unit7 | varchar(20) |
| computing_program | varchar(20) | variable_name8 | varchar(20) |
| method_flag | tiny int | variable_unit8 | varchar(20) |
| variable_no | int | constant1 | float |
| result_name | varchar(20) | constant2 | float |
| result_unit | varchar(20) | constant3 | float |
| variable_name1 | varchar(20) | constant4 | float |
| variable_unit1 | varchar(20) | constant5 | float |
| variable_name2 | varchar(20) | constant6 | float |
| variable_unit2 | varchar(20) | constant7 | float |
| variable_name3 | varchar(20) | constant8 | float |
| variable_unit3 | varchar(20) | constant9 | float |
| variable_name4 | varchar(20) | constant10 | float |
| variable_unit4 | varchar(20) | constant11 | float |
| variable_name5 | varchar(20) | constant12 | float |
| | | source_flag | tinyint) |

If each of the variables has only one unit and the result also has one unit, and the user provides data in the right unit, no drop-down box is necessary on the computing data input form. If the user enters a wrong unit for any of the variables, the result will be wrong. Therefore, it is preferable to contain selectable units in drop-down boxes.

This computing system requires the following interface pages for the user: (1) the first search page, (2) the hot link page resulted from a search, (3) the computing data input form; and (4) the result page containing variable input boxes and submission key so that the user can modify the data for recomputing. Invisible to the user are database access, data assignment in getting data from a remote server, and a call to a program such as CGI C, CGI Perl, Java Servlet, JavaBean, shell or compiled C.

Even though the four interface pages are nearly identical, this version of computing system has to handle three things slightly differently. First, it has a large number of variables and a large number of constants. If only one database table is used, the database accessing program should be able to handle more fields. If plural database tables are created and used in the same computing system, its program uses variable number and constant number to determine which database table the system should find the project data for a given computing project. The rule is that the computing system uses the smallest table possible for a given project. The same rule is applicable when retrieving project data. Only the projects that do not fit in the linear_matrix and two-variable tables are written into this general table. When plural tables are given, it is easy to set up criteria based upon the number of variables and the number of constants.

The system is implemented to generate computing data input form for a plurality of variables and a plurality of result names. A computing data input form for three variables is shown in FIG. 4C. The user enters "100.10" "10.0" and "0.995" for three variables 6 (i.e., compound weight, formula weight, and volume) and, for variable units 7 selected "Grams" for compound weight, "Grams/Mol" for formula weight, "Litter" for volume, and "Molality" for the result unit 9. Upon submission, the server sends the same computing data input form containing "10.0603" in the result value 8 (concentration). A computing project containing seven result names 17 is shown in FIG. 5B. The final computing program must be able to accept more variable values or arguments. It is straightforward to implement final computing programs accepting more name-values or arguments.

The method of counting the number of project records disclosed for the multiple unit conversions is equally applicable to such general case. The difference is how to determine the number of records. If a variable X1 has two units while others each has only one unit, the project needs two records to hold project data. If another variable X2 also has two units, then the group requires four records. If a third variable X3 accepts three units, then the group would require 2*2*3=12 records. If the result is displayed in 2 selectable units, it then requires 12*2=24 records. The total number is thus 2*2*3*2. If the locations of four numbers mean four different variables and each of the numerals mean different units (1 means unit 1, 2 means unit 2, and 3 means unit 3), the combinations of all possible units are 1,1,1,1; 1,1,1,2; 1,1,2,1; 1,1,2,2; 1,1,3,1; 1,1,3,2; 1,2,1,1; 1,2,1,2; 1,2,2,1; 1,2,2,2; 1,2,3,1; 1,2,3,2; 2,1,1,1; 2,1,1,2; 2,1,2,1; 2,1,2,2; 2,1,3,1; 2,1,3,2; 2,2,1,1; 2,2,1,2; 2,2,2,1; 2,2,2,2; 2,2,3,1; and 2,2,3,2. Therefore, the total number of the records necessary for holding project data is the product of all allowed unit numbers for all variables and the result. This rule is slightly different from the rule stated for multiple unit conversion case where conversion between the same unit is not necessary.

Each data point may be an algebra expression. For example, data point may be (15/3) as shown in FIG. 5A and (12/15+34)*log 5 as shown in FIG. 6C. This can reduce a step of preparing variable values for use in computation. If a project accepts only one set of units, the user may have to convert variable values using multiple unit conversion projects before the user can compute to solve his problem.

It is preferable that the data assignment component, which has been part of the final computing program in getting computation data from a remote server, may be a separated program so that it can specifically handle data assignment.

Also, it is preferable that database access be implemented as a separated component so that it has the maximum flexibility.

The computing data input form discussed above is capable of collecting data for most computing projects, but cannot be used to collect data and present result for algebra and statistic. In this embodiment of the present invention, a special database table is built for holding special project data. This form is designed to accept plural data blocks, which may be vector or matrix, and return plural data blocks.

One example is a data input form for finding a solution to a linear equation (FIG. 5A). The project record for creating this form has two variable names 15: matrix data, and right vector, and each is associated with a textarea. It has also result unit 16 which is NA in this instance. The initial data input form has three textareas for storing results, one for the original matrix, one for row permutation, and one for solution. After the user provides data (1, −1, 2, 1, −2, −1, 3, −1, 15/3) in a 3×3 matrix and a vector (1, 2, 3), the JSP computing program returns the original matrix, and the result 17: row permutation (5, 5, 5) and a solution (1.4286, −0.1429, −0.2857). Each of the data points such as "15/3" in the matrix data 15 may be entered in the form of an algebra expression. This database table contains some additional fields such as variable number ("variable_no") and result number (result_no). Each of the variable data block may be treated as one data string which is stored in a textarea. If a computing project defines N variable names, it would create N textareas, one for each of the variable names. If result_no is M, the form produces M textareas for result names. Each of the textareas may be displayed as a box. When the JSP form-making program fills a textarea with a large amount of data, it creates the textarea in a size which is large enough to hold the data when it updates the computing data input form. The form making program knows the number of data points and the number of column, and thus the row number from counting the space fillers and the carriage return marks in the data string.

Another example is a statistical project for determining if two of the variables are significantly different (assuming an equal variance) (FIG. 5B). The word "variable" (i.e., "random variables") in statistics is completely different from "variable" used in describing the computing system. The record for creating this project instructs the form-making program to create two variables 15, both in textarea, two variable units 16, seven result names 17, and seven result units 18. The form can accept data in any of the possible delimits such as space, tab and semicolon, in any arrangement since the data are parsed and extra spaces are removed before they are used for computation. The result is returned as seven textareas. In this case, all units are defined as NA and appear as NA in the computing data input form.

If the computing program is an executable accepting command line arguments, the rule for packing data has been discussed in the context of making computing data input form. When a vector or matrix of data is submitted to the JSP computing program, the program must retrieve the data and pack the data points as one command argument. Each of the individual data points must be packed without a space. As discussed, data points (11, 22, 33) may be packed as "11%XX22%XX33", and a carriage return may be coded into the string as a unique string such as "%##." According to such a schema, 11% XX22%##33%YY44 is actually a 2*2 matrix, and can be passed to the executable as one command line argument. The same or similar schema can be used by the final computing program in returning plural data points such as vector of doubles (3.12, 2.32, 34.5). The values of the results that the final computing program returns are also packed according to the schema. Then, the space fillers and carriage-return marks are replaced respectively by spaces and a carriage returns before the results are sent to the browser. The output of the special computing data input form is not limited to one simple number. It can be used to compute problems such as normal distribution, t-distribution, and F-distribution, variance analysis, solving linear equations, and calculus.

Optionally, a method may be implemented to control computing precision for various projects by adding a new field such as sig_digit. This could be implemented in all project tables so that each of the project creators can determine how many digits the results should have. Moreover, a plural precision data may be coded in one string such as "(8,4:12,2)." This string means that the first result is printed with 8-character width including four decimal places and the second result is printed with 12-character width including two decimal places. The final computing program knows how many digits are returned for each of the results. In the alternative, significant digits may be controlled by using method_flag. For example, a computing method with method_flag=1050 conducts a computation using linear equation and returns the result with six decimal places. Another computing method with method_flag=1049 performs the same task, but returns the result with two decimal places.

For a simple computing project, the server could get all constants when it generates the computing data input form and writes them as hidden data on the computing data input form. After the user submits the computing data input form, the server can directly conduct computation without further contacting the database table. This could help the computing system avoid accessing the database the third time. However, it may be burdensome to carry a large number of constants as hidden fields and then decide which of the sets of the constants are used in the final computation. The method of avoiding one round of accessing database may be useful only in some applications.

There are many other ways to use group_id. For example, the group_id may be just the record number from the first record to the last record. This design can eliminate the group ids duplicate issue in the same database table because group_id is used in a totally different way. Thus, the value 8 means that the subsequent 7 records are for the same group. The record_id for the first record is 40, and records 41, 42, 43, 44, 45, 45, 46, and 47 all belong to the same group. If more records are added to the same group, this value 8 must be changed accordingly. Since the record id is numbered in succession, addition of a record to a group is not convenient.

All computing data input forms allow users to conduct continuing or repeating computation just shown FIG. 1D. Therefore, the previous user-selected variable units, result units, and other user data are printed as default values in the respective boxes, and the computed result is printed in a non-editable field on the web page. This form also contains all other necessary variables such as record_id or group_id in hidden fields. If the user wants to change one or more units or change variable value, the user can get new result by pressing the "Compute" key.

Three different ways of search methods are implemented: search by relevancy, search by project number, and advanced search (FIG. 4A).

Search by computing project ID is that the server looks for a project ID number and gets only one responsive link. Each of the computing project is assigned with a computing project number, which may be indexed as primary key. If a user knows the number, the user can retrieve this computing project without any other hit. This number, after it has been generated and published, should not be changed.

Advanced search may be used to retrieve a narrow set of computing projects from a large database table. The user enters the quantity or dependent variable to be computed, and all of the variable names in plural search boxes (FIG. 4A). The server then searches for those keys, and returns only the records that have all of the search keys. It may allow the user to specify match criteria such as like, exact match, or including for each of the variables and the dependent variables. FIG. 4A shows that a search is conducted by using an advanced search method. The user may increase the number of variables by clicking on "Click for More Variable". After the user gets an uploading form for a right number, the user provides "concentration" in the result name box 8, and "compound wt" in the first variable name 6, and submits the page, the server returns the link 3 (FIG. 4B).

Relevancy search may be used to hunt for a computing project that user may be not sure. It is intended to return a certain number of computing projects by one or more search keys. When the system has a limited number of computing projects, the search method should be as inclusive as possible. However, if the system is loaded with a large number of computing projects, it may be more selective. If necessary, it may use ranking methods to display all hits.

H. Implementing Different Computing Methods

When a program is intended to handle many computing projects, it is desirable to use method_flag. The method_flag has the following values:

TABLE 12

An example of computing method assignments in a method table

| Variables/Constants | Method | Flag | User Input Box/Drop-down |
|---|---|---|---|
| 0/1 | Constant | 1 | No input box |
| 1/2 | Linear | 1000 | 1 box fixed |
| 1/2 | Linear | 1050 | 1 box, 2 drop-downs |
| 1/2 | Linear | 1051 | 1 box, 2 drop-downs (successive conversion) (for internal upload only) |
| 1/2 | Linear | 1052 | 1 box, 2 drop-downs (special conversion) |
| 1/2 | Linear | 1100 | 1 box, 2 drop-downs |
| 1/3 | Square | 1150 | 1 box, 2 drop-downs |
| 1/4 | Cubic | 1200 | 1 box, 2 drop-downs |
| 1/0 | Square Rt | 1250 | 1 box, 2 drop-downs |
| ... | | | |
| 2/4 | Co-linear | 2000 | 2 boxes 3 drop-downs |
| 2/6 | Square | 2001 | 2 boxes 3 drop-downs |
| ... | | | |
| 3/unknown | Co-linear | 3000 | 3 boxes 4 drop-downs |
| 3/unknown | Square | 3001 | 3 boxes 4 drop-downs |

In this table, the values of method_flag are assigned in relation to the number of variables. If no variable is used, the result is a constant. For the computing projects involving only one variable, the value range of the method_flag is from 1000 to 1999. For two variables, the value range is from 2000 to 2999; and for three variable methods, the values is in the range of 3000-3999. Also, the values of method_flag are used in the interval of 50 or other proper internal so that additional values will be available for handling special cases such as range limits, equation variants, and special data source requirement (In addition to the signal of source_flag). This assignment scheme is arbitrary and different assignments may be used to achieve the same objective. More detailed assignment examples of method_flag values are as follows:

TABLE 13

Method table showing computing programs and method flags

| Computing_Program | Method_flag | Math Equations | Notes |
|---|---|---|---|
| s1vp | 1000 | $y = c_1 * x + c_2$ | General Use |
| s1vp | 1050 | $y = c_1 * x + c_2$ | Unit conversion |
| cgicp | 1051 | $y = c_1 * x + c_2$ | (Internal upload only) |
| s1vp | 1052 | $y = c_1 * x + c_2$ | (Internal upload only) |
| s1vp | 1100 | $y = c_1 * x$ | None |
| s1vp | 1150 | $y = c_1 * x * x + c_2 * x + c_3$ | None |
| s1vp | 1151 | $y = c_1 * x * x$ | $x > 0$ |
| s2vp | 2000 | $y = c_1 * x_1 * x_2$ | $x_1 > 0$ & $x_2 > 0$ |
| s3vp | 3000 | $y = c_1 * x_1 + c_1 * x_2 + c_3 * x_3$ | None |

In this table, Computing_Program holds the name of the final computing program which performs the final mathematical computation. The computing program in JSP page (computing.jsp or result.jsp) is a common interface for all computing projects, and is thus not the final computing program. Despite the similar names, their functions are obvious in the contexts.

There are a lot of one-variable methods. Unit conversions are just a special form of linear transformation in mathematics. Method_flag=1050 is for a general multiple unit conversion case while 1051 is a special case that requires a special data accessing method and a special computing algorithm. Single unit conversion that does not belong to any group uses the method with method_flag=1000. If a project comprises a singlet record, no drop-down box is necessary on the computing data input form, but one is produced by the algorithm. However, even if the form-maker program tries to make a drop-down box, it just has one unit in it. In comparison, those plural unit conversions, which are designed as a special group with a special method flag value of 1051, are unique on how to get the units in making the computing data input form. Some unit conversions, which cannot be performed by using a linear equation, may be computed by other proper mathematical equations.

By using different method_flag values to invoke different computing methods in a computing program, hundreds of computation methods may be compiled in the computing program. After the final computing program gets variables and constants, the program uses the method_flag to decide which computing method the program uses. When a method is properly selected, the program uses user-submitted variable values and constants in computing result since each of the methods use a right number of variables and a right number of constants. Some of the variables and constants, even if provided, are ignored if the invoked computing method does not use them.

This above discussion shows that the unique data used in each of the daily computing projects can be stored in one or more database tables. The generic computing operations can be programmed into one or more programs. The system requires only a limited number of reusable computing data input forms for most of the computing projects. To add a new computing project, the only thing required is to add a record into the right table of the database.

I. Interactions Between Different Programs

In the preferred embodiment of the online computing system, computing projects may be displayed under different categories, as an alternative to the search function (FIG. 7). When this page is called, it displays a page of menu items. It has a top menu 23 and sub menu 24. When the user clicks on any of the menu, such as Unit Conversion, the system displays a list of the links, all are about unit conversions. All links are the same as the links created in response to a search.

This page is created by using a menu table. This table contains fields for top-menu, sub-menu, menu_record_id, category, and entries. For a given top menu, each record contains a sub-menu value, category value, and entries value (which contains plural record-id with proper delimit). Each of the project matrix tables has a category field. So, each of the computing projects belongs to a category. The project category view page is created by using the top menu and sub-menu. When a user clicks on a sub-menu, the server gets all records in responsive to the category number and all records whose record_id is in the entries fields. The links are created in the same way they are created in response to a search.

The program is also installed with a power calculator or programmable calculator as shown in FIGS. 6A-6C. The calculator is invoked by searching "calculator" or clicking on the elementary math link on the project view page (FIGS. 6A, 6B, 6C). The calculator accepts any math expression in a textarea (the invoking "project record" is in the special matrix table). The system also has the code for conducting elementary computation for kids (showing the graphics of digital operations of simple computation).

Figure 9:
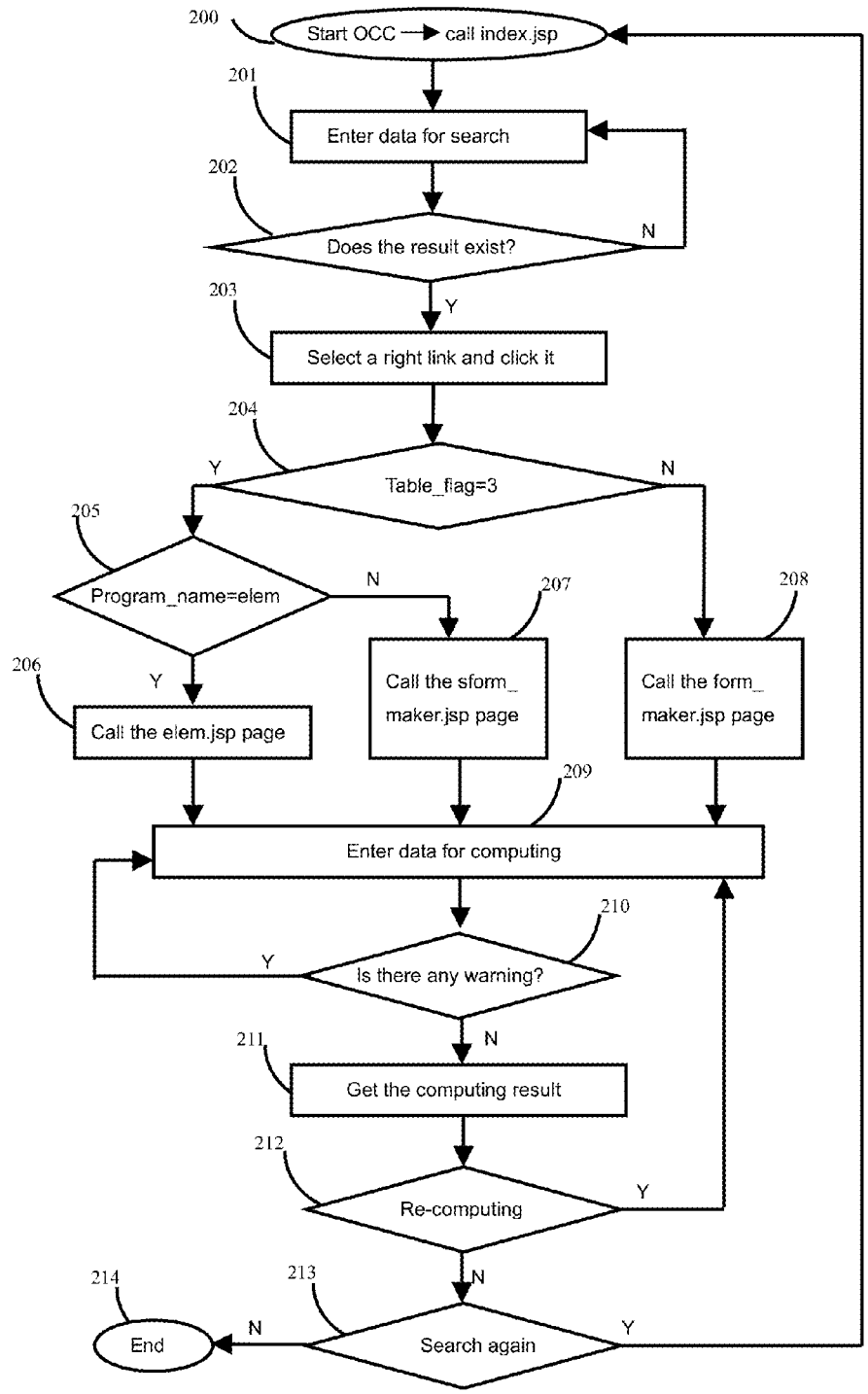
FIG. 9 is a flowchart showing the interactions between different programs and database tables on the computing system of the present invention.

In a preferred embodiment of the present invention, four tables, linear_matrix, middle_matrix, large_matrix, and special_matrix are built. Their variable number/constant number/result number ratios are respectively 1/2/1, 4/8/1, 8/12/1, and 8/8/15. Those tables are assigned with table_flag values of 0, 1, 2, and 3, respectively. Special matrix is used for the special form-making program to generate computing data input forms for taking blocks data such as arrays and vectors. FIG. 9 shows how all tables and all components work together. When a user starts the online computing system, the user may select reference search, project id search, advanced search, and category search under the sub-menu. When a user conducts a search, the system will search through all tables according to the search method used by the user. If no project record is found, it goes back to Step 201. If project records are found, the user selects one of the links at Step 203. Then, the server determines if table_flag is 3 at Step 204. If the table_flag is 3, it determines if the project calls an elementary program at Step 205. If yes, it displays the special data input form for elementary math. If it does not call an elementary program at Step 205, it calls special form making program, which generates a special computing data input form. If the server finds that table_flag is not 3 at Step 204, it runs the regular form making program to generate a normal computing data inputting form. At Step 209, the user types in data and selects proper units for both variable units and result units and then conducts a computation by pressing the "Compute" button. If there is an error in the data the user has entered at Step 210, the client computer prompts the user to correct the error and resubmit the job. If the computing job is submitted successfully, the system computes the result at Step 211, and sets result_values with the computed results and re-send the form with the result boxes filled with computed results. The server displays the result (in a computing form) at Step 212. The user may go back to Step 209 to enter data and resubmit the computing data input form for recomputing. If the user does not want to do further computation, the user may start a new search at Step 213 or end at Step 214.

In conducting the final computation, the server generally uses method_flag and final computing program that are specified in the project record. The only exception is when the project group have method_flag being 1051 and 1052. In those cases, the computing program uses constants from plural project records to perform a special computation.

J. Uploading Project Data for Open Source Computing System

A user can upload computing projects to the system as long as the generic method the user needs is in the final computing program or is available for use. Then, the task of the user is just to add a record into a right database table (FIGS. 8A-8E).

```
<%@ page contentType="text/html; charset=gb2312" language="java"%>
<%@ page import="java.util.*,handbook.*"%>
<jsp:useBean id="computing" class="handbook.computingProgram"
scope="page"/>
<%
Vector computings;
try{
  computing.retrieve( );
  computings=computing.getComputing( );
}
catch(Exception e) {
  RequestDispatcher dispatcher=requestgetRequestDispatcher("error.jsp
  err="+e.getMessage( ));
  dispatcher.forward(request,response);
  return;
}
%>
<html>
[Omitted script for checking description, search_keye, variable_name1,
varialbe unit1, and constant1]
<body>
<h1>Welcome to Online Computing Center</h1>
<table><tr>[Navigation code is omitted]</tr></table>
<hr>
<h3><b>To Create a Computing Project, Please Enter Data Below.
</b></h3>
<form name="frmadd" action="recordAdd" method="post"
onsubmit="return checkForm()">
  <table border="1" bgcolor="#c0c0ff">
  <tr><td><b>Description of computing project</b><br></td><td>
<textareaname="use_description" rows=2 cols=40></textarea></td></tr>
    <tr><td><b>Search Key 1</b><br></td><td><input type="text"
name="search_key1" size=40></td></tr>
    <tr><td><b>Search Key 2</b><br></td><td><input type="text"
name="search_key2" size=40></td></tr>
    <tr><td><b>Computing Method</b><br></td><td><select name=
"computing" style="width:300"><%for(int i=0;i<computings.size( );i++)
{%><option value=<%=computings.elementAt(i)%>>
<%=computings.elementAt(i)%><br>
    <%}%></select></td></tr>
    <tr><td><b>Name of Result</b><br></td><td><input type="text"
name="result_name" size=40></td></tr>
    <tr><td><b>Unit of Result</b><br></td><td><input type="text"
```

-continued

```
name="result_unit" size=40></td></tr>
    <tr><td><b>Variable</b><br></td><td><input type="text"
name="variable_name1" size=40></td></tr>
    <tr><td><b>Unit for Variable</b><br></td><td><input type="text"
name="variable_unit1" size=40></td></tr>
    <tr><td><b>Constant 1</b></td><td><input type="text"
name="constant1" size=40></td></tr>
    <tr><td><b>Constant 2</b></td><td><input type="text"
name="constant2" size=40></td></tr>
    [Hidden fields omitted]
    </table>
    <table>
    <tr><td><input type="submit" name="submit"
value="Submit"></td><td>
    <input type="reset" name="reset" type="reset" value="Reset"></td></tr>
    </table>
    <input type="hidden" name="constant3" size=40> [This is spurious
line.]
</form></body></html>
``` computingProgram is a JavaBean program for getting a list of computing program names and methods from the method table, one version of the method table is shown in Table 12. The form allows the user to fill in use description, search_key1, search_key2, result name, result unit, variable name, variable unit, constant1 and constant2. It also contains a drop-down menu for selecting a computing program (similar to FIG. 8A).

The user starts uploading by signing in a user account. It then starts the page for project upload (FIG. 8A). The user enters all necessary data: title 4, two search keys 1, result name 8, result unit 9, variable name 6, variable unit 7, two constants 28, contributor 29, and use instruction 5 for creating a working project. The user is allowed to select computing method 25 (the method_flag and final program name) from the method table by clicking on "select" and uploads a use instruction file 5. In response, the server displays a page showing program names and methods just like the substance in Table 12 (except the methods noted as for internal upload). Thus, the user can get a right program name and method-flag value.

The meanings of all the fields have been discussed. Upon uploading, the server generates four links 30 (FIG. 8B). The first link allows the user to upload another program. The second line allows the user to test the project the user just uploaded. If the user clicks on the test link (FIG. 8B), the server shows an index page (FIG. 8C). If the user types in the keyword "test" in search box 1, the uploading program searches for the records using "test". If the user clicks on the link 3 associated with the newly created project (FIG. 8D), the server shows a data input form created by the record the user just created (FIG. 8E). The form contains use description 4 and use instruction 5. The user can type in "15" for variable 6, selects a unit for the variable unit 7 and the result unit 9, and conduct a test computation.

FIG. 10 shows the process of uploading computing projects. After starting the computing system at Step 312, the user logs in at Step 313. The server shows the page for uploading a computing project at Step 314. The default uploading form can accept only two variables and two constants (FIG. 8A) and thus the user decides if the project needs more variables at Step 315. The user may provide data on the uploading form at Step 320 and submits it at Step 321. If the user clicks on the "Click Here for More Variables" link (shown on FIG. 8A) at Step 316, the server generates a dialog page promoting the user to enter variable number "X" and constant number at Step 317, and the user provides variable number "X" and a constant number and submits the dialog page at Step 318. The server, in response, sends a new uploading page containing X variables and a required number of constants at Step 319. The user fills the uploading form at Step 320 and submits it at Step 321. The browser checks the data at Step 322. If there is anything to warn, the user is prompted to go back to Step 320. Otherwise, the server sends the summary page shown in FIG. 8B at Step 323. If the user selects "Test the Computing Project" at Step 326, the user is presented with a search page (FIG. 8C) at Step 330, clicks on the found project on FIG. 8D, gets a computing data input form for the newly created project at FIG. 8E, and conducts a test. The user knows if the computing project performs correctly by the test result. The user may choose to go back to the uploading page to add more computing projects at Step 327, report an error at Step 325, or log out at Step 324.

On the uploading page, the user can click a link to request for an uploading form with more variables (FIG. 8A). This uploading form just contains more variables and constants. The user can specify the number of constants and number of variables. The program automatically determine which of the tables the record will be entered. The user can also make selection by using a right name of the final computing program and a generic computing method by using a right method flag. Therefore, it is preferable that the server provides a link or button "Select" (FIG. 8A), which, upon being clicked, will display a chart showing the relationships between mathematical functions and method_flag and computing methods like Table 12.

Each of the programs may have plural methods which may be hidden from the user if the table is printed with multiply exclusive radio buttons. When the user selects a right program name with the listed supported computing equation, the form will pass the program name and method_flag value to the server. It is not necessary for the user to actually type a value of method_flag.

To make it easy for database management, it is preferable that the record_id is generated automatically by the database application. If a computing project contains only a single record, its group_id may be null or zero (unless it is used as a group identity as in some embodiments). If the project contains many records, it is preferable that the server is able to get the first record_id value and write it into the group_id field of each of the records of the group. Therefore, this unique value of the group_id will provide the possibility to add more records to an existing group simply by using the same group_id number (See Table 6).

It is impossible to implement all computing methods so that all of the potential users can use. Therefore, it is desirable to provide a mechanism allowing users to upload program code of final computing program. Each project record contains a final computing program name. If a user can provide his own program, anyone can use the computing method. There are two ways for uploading computing programs. One of the methods is that a program in an interpretive language is loaded into a special folder to which the interpreter is available. For example, if a script in Perl is uploaded to the folder as a final computing program, the invoking line of the script should point to the Perl interpreter of the server. If the program is written in BASIC, the interpreter should be available to run the program in the folder. If the user uploads a C/C++ program, the user should be allowed to compile the program into a binary executable in the folder. This will require file-uploading capability together with a call with parameters to compile the program.

Since it is not proper for a public user to know the paths of all programming tools and libraries. It is desirable to install a Make template on an invisible folder. A utility tool can be developed which is able to copy the Make file to the user's own invisible folder. By using a web form associated with the utility, the user can include required libraries by using library names (without paths) and can change the names of the user's source files. Finally, the user is allowed to send a command from the same web page to invoke the Make file to compile the program. All compilation by remote users must be performed on a dedicated server which can be frequently rebooted.

In the alternative, the user may copy the code into a special web text box. The form is written as a text file. The details may be as follows. When a user enters a computing method in the upload form, the user is asked if the user needs to upload his own final computing program. In the menu, the user is prompted to select his own computing program. When the user chooses to upload a program, the user is prompted to choose between an interpreting program and a compiled program. The user is to select one from a list of supported languages. If a program in Perl or Basic is uploaded, it is immediately available for computation with an indication that the project has not been verified. Thus, one more field may be added on such commercial system.

If the user chooses to upload a program in C or C++ that requires compilation, the submission of the uploading form will be followed by a call to compile it. As long as this temporary folder is in the path of the compiler. This can be done by using a simple command line processor discussed above. Since the system assigned a temporary folder by a randomly generated name, the server can construct a line such as:

```
gcc code_name.cpp -o program_name -L/library_path -Istdc
install m -755 /usr/local/bin
```

The program name must be used as the value of the computing_program. If the program is installed in a system path, it is available for use. However, if the program is installed in a non-searchable path, its name must include the full path (e.g., /usr/local/temp/program_name). To avoid a potential problem of being in conflict with other programs in the operating system, it is preferable to use a special folder for installing such untested program. Since the system knows the path, it should attach a path to the program automatically when a user uploads a record with a program to be compiled.

If the program is run by the JSP page using Command-Processor.java, the program must return the result to the standard output (which is default output of C/C++ program), so the JSP page responsible for printing result can use the same variable to get the compiling result. The command line processor is capable of returning error messages that one could see from the terminal if the program had been compiled at the terminal. Upon successful compilation, the user can immediately make computation using the newly compiled program. If the program is a shell script, it can directly use it by using a command line processor.

K. Using External Data Sources

The computation capability can be expanded further by using a data source flag. The system may use external data from a file or an external link. The format of the source flag field in a string format in one example is like: type:count: path. Type indicates how the data should be processed. There are three choices:

```
f: Formatted data field: constants1 constant2 .... constants5
d: Delimited field: constants1;constant2;....;constants5
I: Labeled field
```

When a labeled variable is used, it may have to provide an assignment rule like the following {first=BankRate&third=FedRate&fourth=StateRate}, where the constants in each of the examples mean the values in ASCII format. Here are some examples of the values of source_flag:

```
d:5:/home/john/testfile.txt
I:5:{first=BankRate&third=FedRate&fourth=StateRate}http://www.source.com/testfile.jsp
```

In the first example, the program reads a text file/home/john/testfile.txt, which has five delimited fields. The second example signals the program to get the web page testfile.jsp using the URL specified, and stores the web page file in temporary folder. The program then searches the file for the name and values and saves them in a two-column string matrix, a suitable structure, or two correspondent string vectors. It then pass them as command line arguments to the final computing program which converts the strings into doubles. If the final computing program accepts only a query string, the program constructs a new string using proper names and values. A project is designed by properly selecting variable names to follow the convention of the source website. The variable names must be changed whenever the name-value convention in the source changes. If the following name-value pairs can be found from a web page:

Name=BankRate Value=5.5; Name=FedRate value=5.4; Name=StateRate value=5.3

The program makes the following assignments for the final computing program:

```
int local_variable1=5.5;
int local_variable2=using database default;
int local_varialbe3=5.4;
int local_ varialbe4=5.3;
int local_varialbe5=using database default;
```

In this example, only first, third, and fourth variables are assigned with the data from the web page. 5 would mean the large data points from the web page. The assignment rule is necessary because the data are passed as parameters to computing programs while the data on other websites are generally provided as name-value pairs. The assignment rule is unnecessary if the computing system and the vendor of the data source follows the same convention in defining name-value pairs.

For simplicity, those fields may be split down into several fields. For example, the number of external data fields may be placed in a tiny integer, and the format may be placed in a string field in the same table. In yet another alternative, source_flag may be just one tiny integer signaling the need for getting external data. If this flag is positive, it then finds the detailed information from a related table, which may contain following fields:

| | |
|---|---|
| record_id | int |
| source_format | varchar(10) |
| source_location | varchar(10) |
| source_assignment | variable(200) |

When the program finds that the source_flag is positive, it searches the related table using the record_id. When the program finds the record_id, the program reads the values from the fields and gets the information about data format, location and assignment rule. If the value of source_location contains "HTTP://", it is necessary to use an assignment rule.

The final computing program will use external data to compute in a way consistent with the method_flag value. This allows the program to use any data as long as the name-value pairs are known so the assignment rule is known. However, the assignment rule must be modified whenever the source vendor changes the variable names.

In those exemplary embodiments of the present invention, specific components, hardware parts, arrangements, and processes are used. Obvious changes, modifications, and substitutions may be made by those skilled in the art to achieve the same purpose of the invention. The exemplary embodiments are, of course, merely examples and are not intended to limit the scope of the invention. It is intended that the present invention include all other embodiments that are within the scope of the claims and their equivalents.

```
Appendix -- webdb.java
package gbp;
import java.util.*;
import java.io.*;
import java.sql.*;
public class webdb {
private CallableStatement WEBDBstmt;
private Connection WEBDBcon;
private ResultSet WEBDBrest;
private String DBURL;
private String DBHost;
private String UserName;
private String Password;
private String DBDriver;
private Properties props;
private String SQLcom;
private String propsFilePath;
private String propsFilename;
public webdb( ) {
    DBURL="jdbc:mysql:";
    DBHost="//local host/handbook";
    UserName="myname";
    Password="passwords";
    DBDriver="com.mysql.jdbc.Driver";
    props=new Properties( );
    props.put("user",UserName);
    props.put("password",Password);
}
public webdb(String s) throws Exception {
    propsFilename=s;
    Properties propsFile = new Properties( );
    InputStream in = new FileInputStream
    ("gbp_properties/"+propsFilename);
    propsFile.load(in);
    in.close( );
    if(propsFile.getProperty("DBURL")!=null) DBURL =
    propsFile.getProperty("DBURL");
    if(propsFile.getProperty("DBHOST")!=null)
    DBHost=propsFile.getProperty("DBHOST");
    if(propsFile.getProperty("USERNAME")!=null)
    UserName=propsFile.getProperty("USERNAME");
    if(propsFile.getProperty("PASSWORD")!=null)
    Password=propsFile.getProperty("PASSWORD");
    if(propsFile.getProperty("SQLCOM")!=null)
    SQLcom=propsFile.getProperty("SQLCOM");
    if(propsFile.getProperty("DBDRIVER")!=null)
    DBDriver=propsFile.getProperty("DBDRIVER");
    props=new Properties( );
    props.put("user",UserName);
    props.put("password",Password);
}
public webdb(String p, String f) throws Exception {
    propsFilePath=p;
    propsFilename=f;
    Properties propsFile = new Properties( );
    FileInputStream in = new
    FileInputStream(propsFilePath+propsFilename);
    propsFile.load(in);
    in.close( );
    if(propsFile.getProperty("DBURL")!=null) DBURL =
    propsFile.getProperty("DBURL");
    if(propsFile.getProperty("DBHOST")!=null)
    DBHost=propsFile.getProperty("DBHOST");
    if(propsFile.getProperty("USERNAME")!=null)
    UserName=propsFile.getProperty("USERNAME");
    if(propsFile.getProperty("PASSWORD")!=null)
    Password=propsFile.getProperty("PASSWORD");
    if(propsFile.getProperty("SQLCOM")!=null)
    SQLcom=propsFile.getProperty("SQLCOM");
    if(propsFile.getProperty("DBDRIVER")!=null)
    DBDriver=propsFile.getProperty("DBDRIVER");
    props=new Properties( );
    props.put("user",UserName);
    props.put("password",Password);
}
public void connect( ) throws Exception{
    Class.forName(DBDriver);
    WEBDBcon=DriverManager.getConnection(DBURL+DBHost+"?
    user="+props.getProperty("user")+"&password="+
    props.getProperty("password"));
    if(SQLcom!=null) setSQLCom(SQLcom);
}
public void closeConnection( ) throws SQLException
{
    if(WEBDBstmt!=null) WEBDBstmt.close( );
    if(WEBDBcon!=null) WEBDBcon.close( );
    if(WEBDBrest!=null) WEBDBrest.close( );
    WEBDBstmt=null;
    WEBDBcon=null;
    WEBDBrest=null;
}
public void setQuestionMark(int i,String s) throws SQLException{
    WEBDBstmt.setString(i, s);
}
public void setQuestionMark(int i,short s) throws SQLException{
    WEBDBstmt.setShort(i, s);
}
public void setQuestionMark(int i,int n) throws SQLException{
    WEBDBstmt.setInt(i,n);
}
public void setQuestionMark(int i,long n) throws SQLException{
    WEBDBstmt.setLong(i,n);
}
public void setQuestionMark(int i) throws SQLException{
    WEBDBstmt.setNull(i, java.sql.Types.BINARY);
}
public void setQuestionMark(int i, FileInputStream fr, int size)
throws SQLException{
    WEBDBstmt.setBinaryStream(i,fr,size);
}
public void setOutParameter(int i, int type) throws SQLException{
    WEBDBstmt.registerOutParameter(i,type);
}
public int getOutParameter(int i) throws SQLException{
    return WEBDBstmt.getInt(i);
}
public void retrieve( ) throws SQLException{
    WEBDBrest=WEBDBstmt.executeQuery( );
}
public void retrieve(String s) throws SQLException{
    Statement stmt = null;
    stmt = WEBDBcon.createStatement( );
    WEBDBrest=stmt.executeQuery(s);
}
public void executeUpdate( ) throws SQLException{
    WEBDBstmt.executeUpdate( );
}
public void executeUpdate(String s) throws SQLException{
    Statement stmt = null;
    stmt = WEBDBcon.createStatement();
    stmt.executeUpdate(s);
```

```
}
public void setSQLCom(String s) throws SQLException{
    WEBDBstmt = WEBDBcon.prepareCall(s);
}
public ResultSet getResultSet( ){
    return WEBDBrest;
}
public PreparedStatement prepareStatement(String s) throws
SQLException {
    return WEBDBcon.prepareStatement(s);
}
```

What is claimed is:

1. A process for creating computing projects for an online computing system, the computing system comprising a server and at least one client computer connected to the server in a network or the internet, the server running a database application hosting plural computing projects, the process comprising the steps of:
generating an uploading form rendered on a client computer for creating a computing project, the uploading form containing input fields for accepting a project description, necessary form-making data, computation data, and a program name or a program address for calling or invoking a computing program for conducting mathematical computation;
generating a method table rendered on the client computer, the method table showing a plurality of data record entries, each of the data record entries comprising a mathematical equation or a method, a program name or a program address of an associated computing program, and optionally a method flag;
transferring or copying a user-selected program name or program address, optionally together with a method flag from the method table to the uploading form, or providing a program name or a program address, optionally together with a method flag on the uploading form;
filling a project description, necessary form-making data, and computation data on the uploading form;
submitting the filled uploading form to the server;
retrieving data from the submitted uploading form; and
writing the retrieved data as a computing project record for the computing project in a database for computing projects,
wherein, each of the computing project records in the database contains a project description, necessary form-making data, computation data, and a program name or program address for calling or invoking a computing program for conducting mathematical computation, the computing project records are structured to work with a plurality of computing programs installed on a server according to association relationships between mathematical equations or methods and computing programs shown in the method table, and user-provided data for performing a computation using a computing project and the computation data from the computing project record of the computing project are corresponding to variable values and constants used by an associated computing program in computation.

2. The process of claim 1, further comprising the step of displaying category numbers to a user so that the computing project to be created using a category number can be searched and retrieved by the category number.

3. The process of claim 1, further comprising the step of presenting a page for testing a newly created computing project by conducting a computation test.

4. The process of claim 1, further comprising the step of changing the number of input boxes for variables on the uploading form for creating a computing project requiring a different mathematical equation or method.

5. The process of claim 1, further comprising the step of uploading a computing program in a compiled language and compiling and installing the computing program in a designed path of the server, wherein the newly created computing project is able to call or invoke the compiled computing program.

6. The process of claim 1, further comprising the step of creating a computing project with an indication to tell whether the computing project has been verified.

7. A process for creating a computing project for a network computing system, the computing system comprising a server and a plurality of client computers connected to the server in a network or the internet, the process comprising the steps of:
providing a search page for conducting searches by using suitable search keys or numbers;
searching computing projects from a database for storing computing projects in response to a search, and showing existing computing projects;
generating an uploading form rendered on a client computer for creating a computing project, the uploading form containing input fields for accepting a use description, necessary form-making data, at least one piece of application-specific computation data, and information for calling a computing program for conducting mathematical computation;
generating a method table by the server and rendering the method table on the client computer, the method table showing a plurality of data record entries, each of the data record entries comprising a mathematical equation or a method, a program name or a program address of an associated computing program, and optionally a method flag;
providing or setting a computing program name or a program address optionally together with a method flag on the uploading form, and filling computation data and necessary form-making data on the uploading form;
submitting the filled uploading form to the server;
obtaining data from the uploading form; and
writing the obtained data as a computing project record for the computing project in the database, wherein the database is designed to work with a database application and a plurality of computing programs that are installed on a server, and the program name or address in each computing project record is associated with a computing program on the server according to association relationships shown in the method table, whereby, in conducting a computation using a computing project, an associated computing program is able to correctly use user-provided data as variable values and use the computation data from the project record of the computing project as constants.

8. The process of claim 7, further comprising the step of changing the number of input boxes for variables on the uploading form by clicking a hot link or button to reload the uploading form containing input boxes for a desirable number of variables.

9. The process of claim 7, further comprising the step of uploading a computing program in a compiled language and compiling and installing the computing program in a designed path of the server, wherein the newly created computing project is able to call or invoke the compiled computing program.

10. The process of claim 7, further comprising the step of including identification information of a user who created and submitted the computing project and displaying the identification information on the computing data input form for the computing project.

11. The process of claim 7, further comprising the step of verifying the computing project, writing verification information on the computing project record, and showing the verification information on the computing input data form when the computing project is displayed.

12. A computer program product, comprising:
a non-transitory computer-readable storage medium having computer-readable program code embodied therewith, the computer-readable program code executable by a processor on a server to perform an operation comprising:
communicating with a database application installed on the server or running a database application to enable the server to store data in a computing project database and retrieve data from the database;
storing and maintaining a plurality of computing projects, as computing project records, in the computing project database on the server, wherein each of the computing project records comprises form-making data for creating a computing data input form, project-specific computation data for a mathematical function or algorithm of an associated computing program, information for calling or invoking the associated computing program, and search keys to be used by a search method; and
performing computing operations in the steps of:
generating a search page by the server for searching computing projects using search keys, category numbers or project numbers, searching computing projects in the computing project database in response to a search, and finding computing projects;
generating by the server a search result page being rendered on a client computer, the search result page containing a found project or one or more links or buttons, each of which is associated with one of the found computing projects;
generating a computing data input form by the server in response to the search or in response to a click of any of the links or buttons on the search result page, wherein the computing data input form is constructed using data from the computing data record for a found computing project, and contains at least one variable name, an input box for accepting the value of each of the at least one variable, at least one result name, and a submission button;
getting user-provided data from the computing data input form that has been submitted, and retrieving necessary computation data from the submitted computing data input form or from the same project record of the selected computing project in the computing project database;
calling or invoking the associated computing program running on the server to conduct mathematical computation using the retrieved computation data and the user-provided data by the associated mathematical function or algorithm; and
generating a result page on the server and rendering the result page on the client computer displaying the result page, wherein the computing data input form is structured to obtain values for all variables used by the function or algorithm of the associated computing program, the server uses the program name or the address optionally together with a method flag stored in the computing project record to call the associated computing program, and the associated computing program uses necessary computation data from the computing project record as constants and uses obtained values as variable values in conducing the computation.

13. The computer program product of claim 12, wherein each of the computing projects stored in the computing project database comprises a use description, at least one constant, at least one variable name, at least one variable unit, at least one result name, and at least one result unit.

14. The computer program product of claim 12, wherein a plurality of computing projects stored in the computing project database use an identical group number but differ in at least one variable unit or at least one result unit, the computing operations further comprising a step for generating one single computing data input form by placing all variable units in a drop-down box for the variable unit and by placing all result units in a drop-down box for the result unit and a step for retrieving necessary computation data from one of the project records by matching all units in the project records with all units that are selected on the computing data input form.

15. The computer program product of claim 12, wherein searches are conducted by using one of the methods selected from the group consisting of matching user-provided search keys with the search keys stored in computer project records, matching a user-provided number with the project ID of a computing project record in the computing project database, and matching user-provided search keys with computing result names and variable names.

16. The computer program product of the claim 12, wherein the operation further comprises the step of generating a project uploading page for creating a new computing project by using computing project data, the computing project data including a use description, necessary constants, at least one variable name, at least one variable unit, at least one result name, and at least one result unit.

17. The computer program product of claim 16, wherein the operation further comprises the step of generating a method table when the project-uploading page is opened on a client computer, the method table showing a list of mathematical equations, program names of associated computing programs for conducting mathematical computations, and optionally method flags.

18. The computer program product of claim 12, wherein the operation further comprises the step of packing a computing input data form's data to form a suitable data string, passing the data string, as parameters, into a computing program for conducting a mathematical computation, getting a computed result and including the computed result in a computing data input form or a result page for rendering on the client computer.

19. The computer program product of claim 12, wherein the operation further comprises the step of determining the value of each algebra expression which has been entered as a variable value on the computing data input form.

20. The computer program product of claim 12, wherein the operation further comprises the step of conducting computation by using one constant that defines the quantitative relationship between a variable and a result, at least one constant that defines the quantitative relationship between the two units of the variable between two neighboring project records, and at least one constant that defines the quantitative relationship between the two units of the result between two neighboring project records.

* * * * *